US008430053B2

(12) United States Patent
Taylor et al.

(10) Patent No.: US 8,430,053 B2
(45) Date of Patent: Apr. 30, 2013

(54) COLOR-CHANGING EMULSIONS FOR FREEZE INDICATORS

(75) Inventors: Dene H. Taylor, New Hope, PA (US); Carl M. Lentz, Washington, PA (US); Dawn E. Smith, Martinsville, NJ (US)

(73) Assignee: Temptime Corporation, Morris Plains, NJ (US)

( * ) Notice: Subject to any disclaimer, the term of this patent is extended or adjusted under 35 U.S.C. 154(b) by 37 days.

(21) Appl. No.: 13/246,392

(22) Filed: Sep. 27, 2011

(65) Prior Publication Data

US 2012/0079980 A1 Apr. 5, 2012

Related U.S. Application Data

(60) Provisional application No. 61/388,297, filed on Sep. 30, 2010.

(51) Int. Cl.
*G01D 21/00* (2006.01)

(52) U.S. Cl.
USPC .......................................... 116/216; 116/206

(58) Field of Classification Search .......... 116/216–220, 116/206–207; 374/17, 102, 106, 159, 161–162; 426/88; 252/962; 436/2
See application file for complete search history.

(56) References Cited

U.S. PATENT DOCUMENTS

| 2,971,852 | A | | 7/1956 | Schulein |
|---|---|---|---|---|
| 3,145,145 | A | | 8/1964 | Reznek et al. |
| 3,177,843 | A | * | 4/1965 | Geocaris ........................ 116/219 |
| 3,732,141 | A | | 5/1973 | Brocket al al. |
| 3,786,777 | A | * | 1/1974 | Smith et al. .................... 116/206 |
| 3,916,068 | A | | 10/1975 | Kohmura et al. |
| 3,955,025 | A | | 5/1976 | Matsukawa et al. |
| 4,022,149 | A | * | 5/1977 | Berger .......................... 116/219 |
| 4,124,227 | A | | 11/1978 | Ruus |

(Continued)

FOREIGN PATENT DOCUMENTS

| JP | 61053531 | 3/1986 |
|---|---|---|
| JP | 2009-145241 | 7/2009 |

(Continued)

OTHER PUBLICATIONS

Hansen, C. M., Solubility Parameters: A user's handbook, 2000, CRC, p. 77, p. 80, p. 82-83.

(Continued)

*Primary Examiner* — Peter Macchiarolo
*Assistant Examiner* — Tania Courson
(74) *Attorney, Agent, or Firm* — K&L Gates LLP

(57) ABSTRACT

A color-changing emulsion for use in a freeze indicator can employ a dispersion medium, for example, an aqueous liquid, a first reactant phase and a second reactant phase, which two reactant phases can both be dispersed in the dispersion medium. The first reactant phase includes a hydrophobic liquid and a first reactant, for example, a color precursor such as a leuco dye. The second reactant phase can include a hydrophobic liquid, and includes, or can be, a second reactant, for example, a color developer such as a leuco dye developer. The first and second reactant phases can be essentially unmixed, and can be co-reactable to provide a color change. In response to a freezing temperature, the color-changing emulsion can coagulate and change color irreversibly. An intense color change can be obtained by using, for example, a suitable leuco dye precursor and developer.

30 Claims, 4 Drawing Sheets

U.S. PATENT DOCUMENTS

| | | | |
|---|---|---|---|
| 4,148,748 A | 4/1979 | Hanlon et al. | |
| 4,163,427 A | 8/1979 | Cooperman et al. | |
| 4,186,115 A | 1/1980 | Spatz et al. | |
| 4,647,952 A | 3/1987 | Pokora et al. | |
| 4,842,976 A | 6/1989 | Sanders et al. | |
| 5,143,722 A | 9/1992 | Hollenberg et al. | |
| 5,223,412 A | 6/1993 | Wight et al. | |
| 5,489,521 A | 2/1996 | So et al. | |
| 5,587,148 A | 12/1996 | Mitchell et al. | |
| 5,756,788 A | 5/1998 | Mitchnick et al. | |
| 5,942,213 A | 8/1999 | Bara et al. | |
| 5,964,181 A * | 10/1999 | Pereyra et al. | 116/216 |
| 6,060,556 A | 5/2000 | Collins et al. | |
| 6,124,377 A | 9/2000 | Kaiser et al. | |
| 6,258,747 B1 | 7/2001 | Midorikawa et al. | |
| 6,472,214 B2 | 10/2002 | Patel | |
| 6,514,909 B1 | 2/2003 | Austin et al. | |
| 6,694,913 B2 | 2/2004 | Cooperman | |
| 6,846,619 B2 | 1/2005 | Kaneko et al. | |
| 6,878,670 B2 | 4/2005 | Seki et al. | |
| 6,957,623 B2 | 10/2005 | Guisinger et al. | |
| 7,011,037 B2 | 3/2006 | Cooperman | |
| 7,343,872 B2 | 3/2008 | Taylor et al. | |
| 7,429,625 B2 | 9/2008 | Harrington et al. | |
| 7,490,575 B2 | 2/2009 | Taylor et al. | |
| 7,571,695 B2 | 8/2009 | Taylor et al. | |
| 7,770,534 B2 | 8/2010 | Cooperman | |
| 7,891,310 B2 | 2/2011 | Taylor et al. | |
| 8,122,844 B2 * | 2/2012 | Smith et al. | 116/216 |
| 2004/0182304 A1 | 9/2004 | Cooperman | |
| 2005/0038128 A1 | 2/2005 | Argillier | |
| 2008/0014233 A1 | 1/2008 | Schlossman et al. | |
| 2008/0269050 A1 | 10/2008 | Azizian et al. | |
| 2009/0301382 A1 | 12/2009 | Patel | |
| 2010/0162941 A1 | 7/2010 | Lentz et al. | |
| 2011/0209658 A1 | 9/2011 | Smith et al. | |

FOREIGN PATENT DOCUMENTS

| | | |
|---|---|---|
| SE | 9900393 | 8/2000 |
| WO | 9802722 | 1/1998 |
| WO | 2005054800 | 6/2005 |
| WO | 2007148321 | 12/2007 |
| WO | 2010014730 | 2/2010 |

OTHER PUBLICATIONS

Schenectady International, HRJ-2053 Resin Carbon Solid Developer, Technical Data.
Wikipedia, Janus Particles, downloaded Aug. 19, 2010.
Wikipedia, Phenolphthalein, downloaded May 26, 2010.
Wikipedia, Pickering emulsion, downloaded Aug. 19, 2010.
Muthyala, "Chemistry and Applications of Leuco Dyes", Topics of Applied Chemistry, 1997 Plenum Press, New York, pp. 198-205.

* cited by examiner

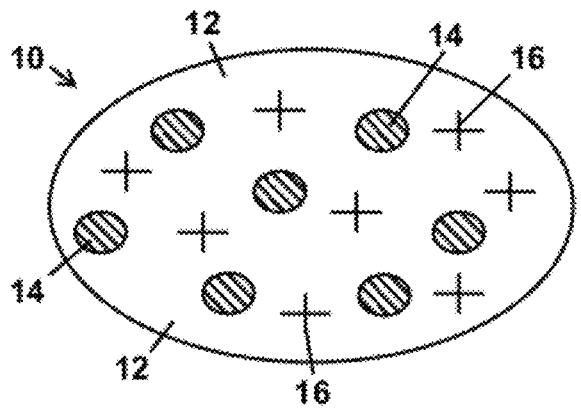
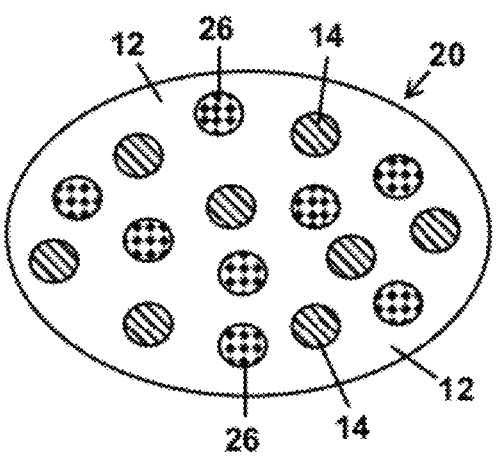
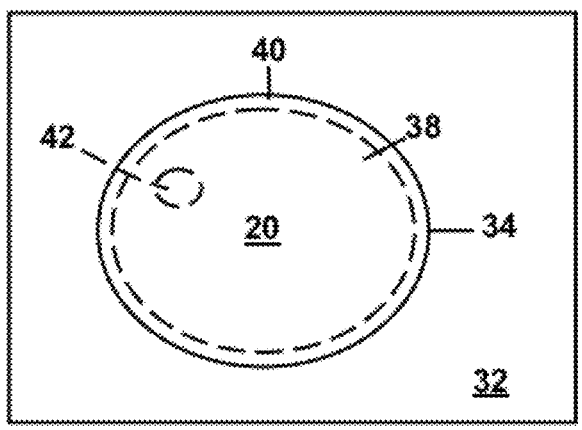
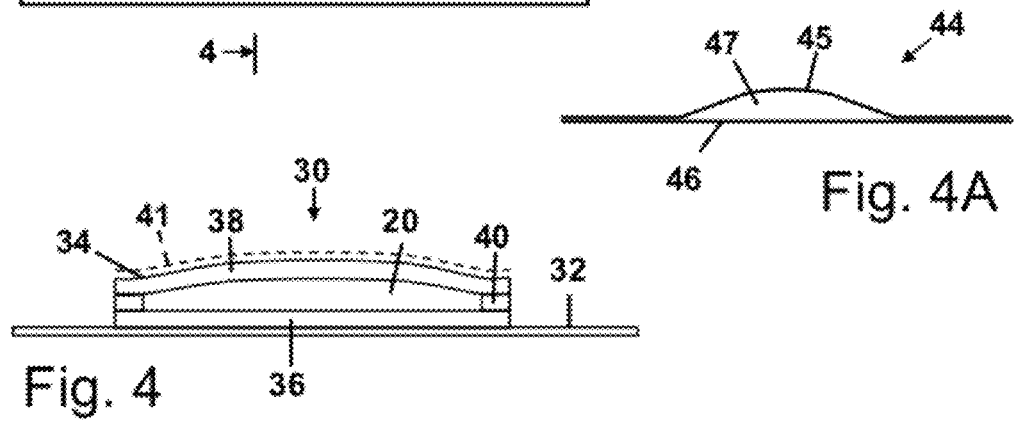

COLOR-CHANGING EMULSIONS FOR FREEZE INDICATORS

CROSS-REFERENCE TO A RELATED APPLICATION

This application claims the benefit of provisional patent application No. 61/388,297, filed on Sep. 30, 2010, the entire disclosure of which is incorporated by reference herein for all purposes.

STATEMENT REGARDING FEDERALLY SPONSORED RESEARCH OR DEVELOPMENT (Not Applicable.)

The present invention relates, inter alia, to color-changing emulsions for freeze indicators, to methods of making color-changing emulsion emulsions for freeze indicators and to freeze indicators including color-changing emulsions. The present invention also relates to methods of making the freeze indicators and to host products associated with, or monitored for freeze exposure by, a freeze indicator according to the invention.

BACKGROUND OF THE INVENTION

Many commercial products are temperature sensitive and can spoil, deteriorate or lose quality if they suffer sufficient exposure to a freezing temperature that is near or below the freezing point of water. For example, some foodstuffs, such as fruits and salad greens, can spoil, and vaccines, biological and other pharmaceutical products, and medications, can lose potency if exposed to a freezing temperature. In some cases, a cold-sensitive product may suffer a loss of quality owing to exposure to an unduly cold temperature, without exhibiting any clear change in appearance or other overt characteristic.

To help monitor for possible exposure of a host product to a freezing temperature, and a consequent loss of quality, a freeze indicator can be employed. One type of freeze indicator useful for this purpose provides an irreversible optical indication of past exposure of a host product to a freezing or near freezing temperature. The freeze indicator can be associated with a freeze-sensitive host product, for example by attaching the freeze indicator to the host product or a package or container for the host product. The freeze indicator can then monitor temperature conditions similar to those to which the host product is exposed during the distribution of the host product from a supplier to an end user, or for another period of interest.

Various proposals for freeze indicators are known. For example, U.S. Pat. Nos. 7,343,872; 7,490,575 and 7,571,695 and U.S. Patent Application Publication No. 2008/0257251, all having inventors Taylor et al., disclose a variety of freeze indicators and freeze indicator technologies. These patents and patent application publications are referenced herein as the "Taylor et al. patent publications." Also, U.S. Patent Application Publication No. 2010/0162941, by Lentz et al., referenced herein as the "Lentz et al. patent publication" and No. 2011/0209658 by Smith et al., referenced herein as the "Smith et al. patent publication", disclose a variety of freeze indicators and freeze indicator technologies. Each of the Taylor et al., Lentz et al. and Smith et al. patent publications is incorporated by reference herein in its entirety.

As described in their specifications the Taylor et al. and Lentz et al patent publications disclose freeze indicators which employ an indicator element including a dispersion of particles in a liquid medium. The indicator element can change appearance irreversibly upon exposure to freezing temperatures, for example as a result of coagulation of the dispersed solid particles, providing a signal that the freeze indicator has been exposed to a freezing temperature.

BRIEF SUMMARY OF THE INVENTION

The present invention provides, inter alia, a color-changing emulsion useful in a freeze indicator and a freeze indicator incorporating such a color-changing emulsion. The color-changing emulsion employs a new mechanism to signal, or indicate, freeze exposure.

Thus, the invention provides, in one aspect, a freeze indicator including a color-emulsion which freeze indicator can initiate a color-changing chemical reaction in response to freeze exposure. The color-changing reaction can enable a variety of different indicator signals to be generated, according to the reactants employed, and some embodiments of the inventive freeze indicator can provide an intensely colored optical signal to indicate freeze exposure.

In another aspect, the invention provides a color-changing emulsion for use in a freeze indicator, which color-changing emulsion includes a dispersion medium, a first reactant phase and a second reactant phase. The dispersion medium can be, or can include, an aqueous liquid. The first reactant phase can be dispersed in the dispersion medium and can include a first reactant and a hydrophobic liquid. The second reactant phase can also be dispersed in the dispersion medium, and can include a second reactant. The second reactant phase can be unmixed with the first reactant phase. The first reactant and the second reactant can be co-reactable, to provide a color change, for example in a chemical reaction. In response to exposure of the emulsion to a freezing temperature, the first reactant and the second reactant can co-react to change the color of the color-changing emulsion irreversibly.

At least one of the first reactant and the second reactant can be dissolved, for example, dissolved in a hydrophobic liquid, or can be a liquid. Also, in response to the exposure of the color-changing emulsion to a freezing temperature, the color-changing emulsion can coagulate, causing the first reactant and the second reactant to co-react. To help provide an indicator signal, the first reactant phase can coalesce with the second reactant phase in response to exposure of the emulsion to a freezing temperature.

The color-changing emulsion can include colloidal particles of the first reactant phase and colloidal particles of the second reactant phase. For example, the first reactant phase and/or the second reactant phase can be present in the color-changing emulsion as dispersed colloidal particles.

Optionally, the color-changing emulsion includes an ice nucleant dispersed in the dispersion medium. The ice nucleant can reduce the difference between the melting point and the effective freezing point of the dispersion medium which commonly occurs as a result of supercooling.

If desired, the color-changing emulsion can include an emulsion stabilizer component. The stabilizer component can be configured to stabilize the color-changing emulsion at a temperature above freezing, and to permit the color-changing emulsion to coagulate in response to a freezing temperature.

In some useful embodiments of the invention, the first reactant includes a color precursor, for example a leuco dye precursor, dissolved in the hydrophobic liquid and the second reactant includes a color developer, for example a leuco dye developer, that can react with the color precursor to develop the color. Alternatively, the first reactant can include a color developer and the second reactant can include a color precursor. Use of leuco dye reactants can yield an intense color change, in some cases.

In further embodiments of the invention, one of the first reactant and the second reactant comprises a colored material and the other of the first reactant and the second reactant comprises a color-depleting agent. Coagulation of the emulsion in response to freezing can bring together the colored material and the color depleting agent causing the color depleting agent to react with the colored material to deplete the color of the colored material.

The hydrophobic liquid can include a first hydrophobic liquid and the second reactant can be dissolved or dispersed in a second hydrophobic liquid. The second hydrophobic liquid can be the same as, or different from, the first hydrophobic liquid.

The dispersion medium can include at least about 10 percent by weight, based on the weight of the dispersion medium, of deuterium oxide or of deuterated water or of a mixture of deuterium oxide and deuterated water. Deuterium oxide or deuterated water can help raise the melting point of the dispersion medium and thus also raise the effective freezing point of the dispersion medium.

The color-changing emulsion can be incorporated in any suitable freeze indicator. For example, the freeze indicator can include an envelope containing the emulsion. The envelope can entirely enclose the color-changing emulsion with vapor block material and can be sealed around the color-changing emulsion to prevent loss of water vapor from the color-changing emulsion, if desired. The freeze indicator can include a substrate supporting the envelope, which substrate optionally provides a light-reflecting background for the emulsion.

The color-changing emulsion can modulate light reflected from or transmitted by the freeze indicator and the freeze indicator can include an additional light-modulating element, for example a light filter, to modify the appearance of the color-changing emulsion, if desired.

In a further aspect, the invention provides a method of making a color-changing emulsion for use in a freeze indicator, which can be used for making embodiments of the color-changing emulsions described herein and of other color-changing emulsions. The method can include dissolving, or dispersing, a first reactant in a hydrophobic liquid to provide a first reactant phase, and dispersing the first reactant phase in an aqueous liquid dispersion medium to provide a first reactant dispersion.

The method can also include mixing a second reactant phase including a second reactant with the first reactant dispersion to provide the color-changing emulsion. The first reactant and the second reactant can be co-reactable to provide a color change. The resultant color-changing emulsion can change color irreversibly in response to exposure of the color-changing emulsion to a freezing temperature, for example, by coagulating and causing the first reactant to react with the second reactant.

Optionally, the method can also include dispersing a second reactant phase including a second reactant in a second dispersion medium to provide a second reactant dispersion. The second dispersion medium can also be an aqueous liquid. The second dispersion medium aqueous liquid can be the same as, or different from, the first dispersion medium aqueous liquid. Further, the method can include mixing the second reactant dispersion with the first reactant emulsion to provide the color-changing emulsion.

Desirably, mixing of the second reactant dispersion with the first reactant emulsion is effected without coalescing the second reactant phase with the first reactant phase.

Optionally, the method can include dissolving a stabilizer component of the first reactant emulsion in the first aqueous dispersion medium prior to dispersing the first reactant phase in the first aqueous dispersion medium.

Further, the method can include providing the first reactant dispersion by dispersing the first aqueous liquid dispersion medium in the first reactant phase to yield a water-in-oil emulsion. This water-in-oil emulsion can then be inverted to yield the first reactant dispersion in the form of an oil-in-water emulsion. This inversion method can facilitate the making of some embodiments of the first reactant dispersion.

The hydrophobic liquid can be a first hydrophobic liquid and the method can include dissolving or dispersing the second reactant in a second hydrophobic liquid to provide the second reactant phase. The second reactant dispersion thus becomes an emulsion, which can be referenced as the second reactant emulsion. The first and second hydrophobic liquids can be the same or different.

The method can also include dissolving a stabilizer component of the second reactant dispersion in the second aqueous dispersion medium before dispersing the second reactant phase in the second aqueous dispersion medium.

The stabilizer component can include a stabilizer compound to stabilize the respective first reactant emulsion or the second reactant dispersion at a temperature above freezing, if desired. Furthermore, the stabilizer component can include a destabilizer compound to facilitate coagulation of the color-changing emulsion at a freezing temperature, if desired.

The method can include providing the second reactant dispersion, if employed, by dispersing the second aqueous liquid dispersion medium in the second reactant phase to yield a water-in-oil emulsion. This water-in-oil emulsion can then be inverted to yield the second reactant dispersion in the form of an oil-in-water emulsion. This inversion method can facilitate the making of some embodiments of the second reactant dispersion. In appropriate cases, both the first reactant dispersion and the second reactant dispersion can be made by inversion processes, if desired.

The invention includes a color-changing emulsion produced by any method embodiments of the invention described herein. Further the invention includes a freeze indicator employing any color-changing emulsion embodiment of the invention described herein. The invention also includes a host product having such a freeze indicator associated with it to monitor the host product for freeze exposure.

BRIEF DESCRIPTION OF THE SEVERAL
VIEWS OF THE DRAWING

Some embodiments of the invention, and ways of making and of using one or more embodiments of the invention, are described in detail herein and, by way of example, with reference to the accompanying drawings (which are not necessarily drawn to scale with regard to any internal or external structures shown), in which like reference characters designate like elements throughout the several views, and in which:

FIG. 1 is a schematic view of one illustrative embodiment of color-changing emulsion according to the invention;

FIG. 2 is a schematic view of another illustrative embodiment of color-changing emulsion according to the invention;

FIG. 3 is a plan view of one illustrative embodiment of freeze indicator according to the invention;

FIG. 4 is a section on the line 4-4 of FIG. 3;

FIG. 4A is a section similar to FIG. 4 of another embodiment of freeze indicator according to the invention;

DETAILED DESCRIPTION OF THE INVENTION

Figure 5:
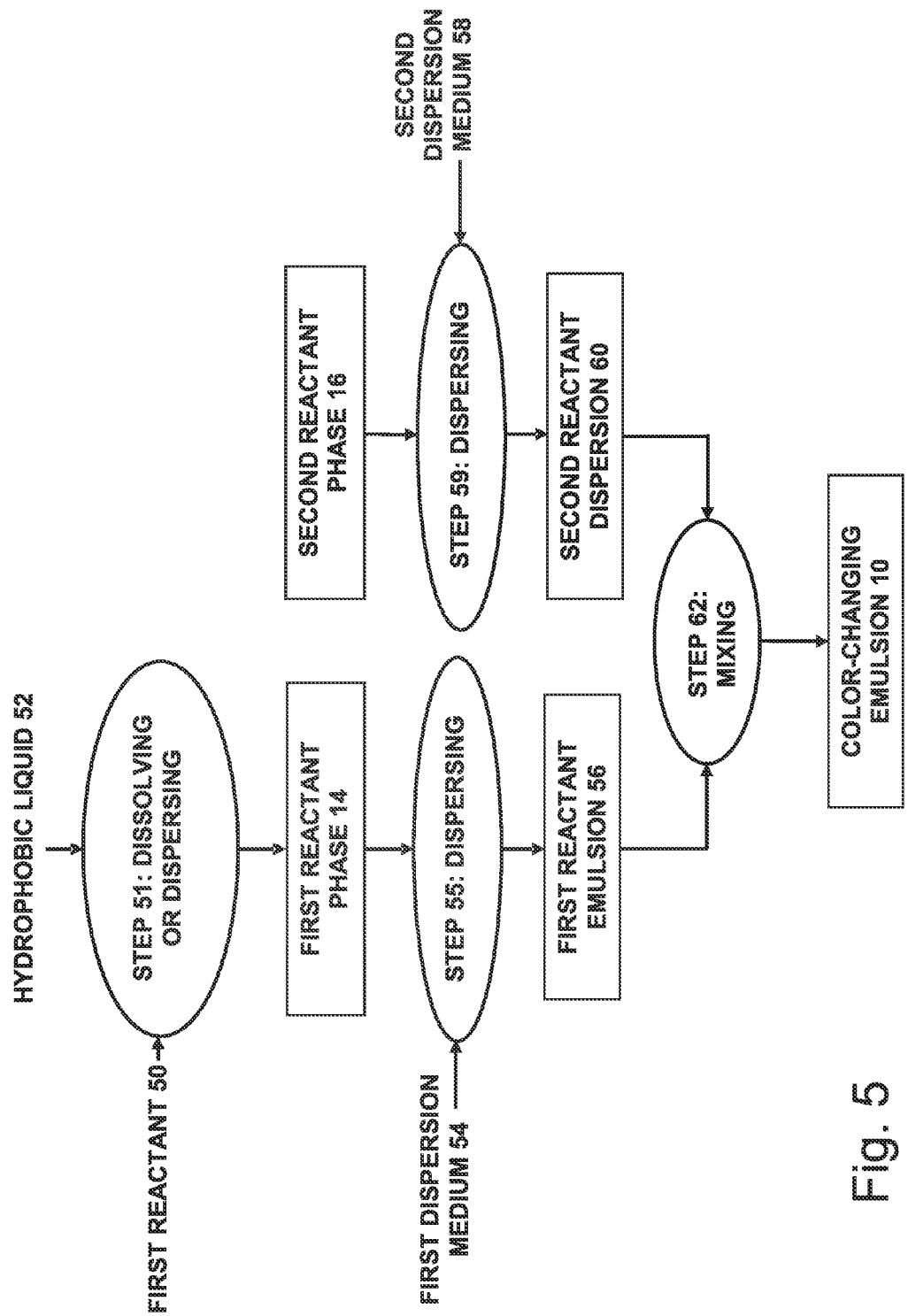
FIG. 5 is a block flow diagram of one illustrative embodiment of a method according to the invention of making a color-changing emulsion, for example, the color-changing emulsion illustrated in FIG. 1.

The present invention provides, inter alia, new emulsions useful in freeze indicators for signaling freeze exposure by changing color in response to the freezing of a component of the emulsion, for example, the freezing of an aqueous liquid component. Some embodiments of the invention may not change color upon freezing but can change color when the frozen emulsion thaws. Some embodiments of the invention show some change in color upon freezing and a greater change when the frozen emulsion thaws. Desirably, the color change is irreversible so that a freeze indicator according to the invention can reliably report past exposure to a freezing event.

The optical signal generated by known freeze indicators, employing appearance-changing dispersions to signal freeze exposure, is usually generated by the interaction of ambient light with the optical properties of the particulate and liquid components of the indicator dispersion, and of the background to the dispersion, if a background is employed. The relevant optical properties of the indicator dispersion include individual ones of, or a combination of, the light reflectivities and/or the light transmissivities of the optically active components of the freeze indicator.

In such a known indicator, a freeze-induced signal can be generated by coagulation of the dispersion, resulting in a reconfiguration of the optically active components of the freeze indicator, and yielding a combination of optical properties after freezing different from the combination prevailing before freezing. For example, before freezing, the appearance of a known freeze indicator dispersion may be provided largely by reflection from particles of pigment, or other material, suspended in the dispersion. After freezing and coagulation of the dispersion a background may become visible through the liquid medium.

The optical characteristics of the indicator signal that can be generated by such a known freeze indicator are usually limited by the inherent optical properties of the active freeze indicator components, which may be largely unchanged by freezing.

A freeze indicator that can generate an optical signal in a new way, that provides the potential for generating a stronger optical signal, would appear to be useful for some purposes.

Pursuant to the present invention, two or more reactants that co-react chemically can be employed to produce a desired color change. Freeze indicator embodiments of the invention can initiate the chemical reaction in response to freeze exposure. One or more of the reactants can be formulated each in a respective oil-in-water emulsion, if desired.

By employing a color-changing chemical reaction to generate an optical signal, the inherent optical properties of one or more components of the freeze indicator can be enhanced, or different "before" and "after" effects can be achieved.

One aspect of the present invention utilizes the discovery that coagulating and then coalescing a mixture of two emulsions, or a mixture of an emulsion and a dispersion of a solid particles in a liquid medium, provides a means of bringing two chemically reactive materials together to co-react. Freezing of a freeze indicator component can be used to cause the coagulation and then the coalescence. In this way the invention can provide a freeze indicator employing one of a variety of different color generating reactions to generate an optical signal that indicates past freeze exposure.

Another aspect of the invention provides a method of indicating exposure to a freezing temperature. This method comprises coagulating a color-changing emulsion comprising a first reactant and a second reactant in response to exposure of the color-changing emulsion to a freezing temperature, and reacting the first reactant with the second reactant to change the color of the color-changing emulsion irreversibly in response to coagulation of the color-changing emulsion.

Pursuant to an exemplary method embodiment of the invention, such a freeze indicator can be made by preparing a dispersion, or a solution, of a color precursor, for example a solution of a leuco dye in an oil, and mixing the color precursor solution with a dispersion of a solid color developer, or with an oil solution of a color developer. The resultant color-changing emulsion can then be employed as an active indicator element of a freeze indicator. Freezing of the emulsion in the freeze indicator can cause the emulsion to coagulate and then cause the droplets in the emulsion, and particles, if present, to coalesce. Coalescence mixes the color developer and the color precursor which then react, generating an intense color, if an appropriate color developer and color precursor are employed.

Such a color-changing emulsion can be combined with a colored background, and/or other color-modulating elements, in a freeze indicator embodiment of the invention to generate any one of a variety of optical signals, upon freezing. For example, the optical signal can be a change from a light color to black, from a light color to a dark color, from green to red, from light green to dark red, from green to black or dark gray, and other desired "before" and "after" color combinations.

A freeze indicator comprising a color-changing emulsion according to the invention can include an additional light-modulating element to modify the appearance of the color-changing emulsion, if desired. The additional light-modulating element can modify the appearance of the color-changing emulsion, before freezing, and/or after freezing, if desired. The light-modulating element can be extrinsic to the color-changing emulsion or intrinsic to the color-changing emulsion. An example of a useful extrinsic light-modulating element is a color filter configured to filter light traveling between the color-changing emulsion and a viewer or a viewing device, for example, by covering or extending around the color-changing emulsion. An example of an intrinsic light-modulating element is an auxiliary colorant, such as a dye or a pigment, dissolved or dispersed in one or more phases of the color-changing emulsion.

In a further aspect, the invention provides a freeze-sensitive fluid, for example an emulsion, useful, inter alia, in a blister-style freeze indicator including a bubble-shaped portion sealed to a substrate portion to provide a container for the freeze-sensitive fluid. The freeze-sensitive fluid can comprise a colloidal emulsion or dispersion that undergoes an irreversible change in appearance on freezing through collapse of the emulsion or dispersion. Non-colloidal emulsions or dispersions can be employed, if desired. The emulsion, can be the product of a mixture of emulsions, if desired. The emulsion can include two or more different phases, at least one of which is liquid, dispersed in a common liquid dispersion medium which can be aqueous, for example. The other dispersed phase, or phases, can be liquid or solid.

Upon collapse, the colloidal emulsion can coalesce so that the individual particles of the emulsion merge with each other and with other dispersed particles in the emulsion enabling reactants present in the various particles to co-react to provide an optical signal indicating freeze exposure. The signal can be a color change, for example, the appearance of a new hue that was not present before freezing.

One of the dispersed phases of the emulsion can contain an essentially colorless color precursor and the other dispersed phase, or one of the other dispersed phases, can contain an essentially colorless color developer, which color precursor and color developer can react with each other, i.e. can co-react, to produce a color, which, with appropriate choice of reactants, can be intense. The color produced can also contrast markedly with the indicator color before freezing, in some cases.

In another embodiment of color-changing emulsion according to the invention, either one or both of the color precursor and the color developer can be light-colored and the reactants can be selected to produce a substantially darker color, which, with appropriate choice of reactants, can be intense, when the color precursor and color developer co-react. The darker color can contrast with the initial appearance of the emulsion and provide a good optical signal of exposure to freezing.

Alternatively, by using a color-depleting agent in one of the disperse phases, and a colored material sensitive to the color-depleting agent in the other disperse phase, a freeze indicator that changes from a dark color to a light color can be formulated. For example, the colored material can be reversibly developed to have color by using a color developer and the color-depleting agent can reverse the color development reaction, decolorizing the colored material. Using a suitable color precursor or other colorizable material, the color developer can be acidic and the color-depleting agent can be alkaline, if desired.

Other color-changing reactions can be employed, if desired.

In a further aspect, the invention provides a fluid composition for use in freeze indicators, which composition employs freeze-induced colloid collapse to provide a freeze exposure signal. The fluid composition can be a mixture of two separate, but compatible, emulsions. Each of the two compatible emulsions can include suspended droplets of a liquid which is a solution containing one or the other of a pair of reactive compounds. On coalescence, the reactive compounds can react to produce a high intensity optical change in the appearance of the fluid that can be detected externally, either visually, or with a suitable optical detection device. The two compatible emulsions can be colloidal, but need not be. Also, the two compatible emulsions can be stabilized so that the liquid droplets remain suspended for long periods, and will coagulate, and coalesce irreversibly, when the mixture is frozen.

In one embodiment of this further aspect of the invention, one emulsion can be made by dispersing a solution in oil of a leuco dye precursor, into water, optionally by employing high shear agitation and one or more surfactants. The other emulsion can be similarly prepared using a solution in oil of a dye developer instead of the dye precursor. If desired, by employing an appropriate leuco dye precursor and an appropriate leuco dye developer, a color density change of at least 0.4 optical density ("OD") units can be produced by the collapse of an emulsion in a layer that is 1 mm or less in thickness. Some embodiments of the invention can provide a layer of collapsed emulsion that is 200 µm or less in thickness which yields a color density change of at least 0.4 OD units upon collapse. An optical density change of at least 0.4 OD units can correspond with a color change that is identifiable by an average human viewer at an arm's length viewing distance or another convenient distance, without special viewing equipment. In some cases, an optical density change of at least 0.4 OD units will be distinct and unmistakable.

The mixed emulsions employed in this aspect of the invention can have any suitable appearances before freezing and after freezing (or after freezing and thawing). For example, the initial appearance can be opaque and white, near-white, light colored, or transparent, so that the starting point is light, or the color of a background, which can be provided behind the emulsion, if desired. By selecting dye precursors, or other color precursors, that become red or black on development, the signal provided by the color produced on freezing can be understood to indicate that an associated host product may have a quality problem, may have lost freshness, or may have become unsafe.

Some terminology used in this specification is discussed in the following paragraphs. The term "ambient temperature" is used to refer to the temperature of the environment surrounding a freeze indicator or a freeze indicator emulsion. In temperate and warmer climates, ambient temperatures will usually be above freezing for most of the year and in some instances may be as high as 40° C., or more. In wintry conditions, under refrigeration, in cold containers, and the like, ambient temperatures may be freezing, near-freezing or even lower temperatures.

The term "room temperature" is used to refer to a temperature of about 20° C. to about 25° C. If the context calls for a specific room temperature, a temperature of 25° C. is to be understood.

The terms "coagulate" and the grammatical variations thereof, including "coagulating" and "coagulation", are used in this specification to refer to gathering together, or forming into a mass or a group, and in the case of the verb, to cause coagulation.

The terms "coalesce" and the grammatical variations thereof, including "coalescing" and "coalescence" are used in this specification to refer to growing together, uniting or joining together, into one body or product, or becoming integrated into a whole. In the cases of the dispersions and emulsions described herein, coalescence can be understood generally, but not always, to be preceded by coagulation.

The term "freezing temperature" is used herein to refer to a temperature that will cause an aqueous freeze indicator dispersion medium such as is described herein, to form ice crystals.

The "effective freezing point" refers to the highest temperature at which a dispersion medium will begin to form ice crystals.

The term "freeze" and grammatical variations thereof, including "freezing", is used to refer to the freezing of water.

The terms "water-in-oil" and "oil-in-water", as used herein in relation to emulsions, refer generally to the structure of the emulsions so referenced. Thus, a water-in-oil emulsion can usually be understood to comprise droplets of an aqueous phase dispersed in an oily liquid, and an oil-in-water emulsion can usually be understood to comprise droplets of an oily phase dispersed in an aqueous liquid, unless the context indicates otherwise.

Color Change. Reference herein to a "color change", or to a grammatical variation of the term "color change" is intended to include any change in the optical properties of a freeze-sensitive emulsion caused by freezing that can be detected externally of a freeze indicator employing the freeze-sensitive emulsion. The color change can be detected by a suitable instrument, or visually by a human agent. The color change can be a change from the color of the emulsion before freezing to the color of the emulsion after freezing, or after freezing and thawing. Depending upon the color change technology employed, the color of the frozen, unthawed mixture may be lighter than that of the thawed emulsion, owing to the presence of ice crystals in the frozen, unthawed emulsion.

Some examples of color changes included are changes between any two of white, gray, black, red, yellow, blue, green, purple, orange and brown, and any tints and shades of the foregoing colors. Some embodiments of freeze indicator according to the invention employ a change from white, light or colorless to red or to black or to violet.

The color change can be a change in hue, value or chroma, or a change in any combination of hue, value and chroma. The color change can be a change from a chromatic or an achromatic color before freezing, to either a chromatic or an achromatic color after freezing, or after freezing and thawing. For example, the emulsion may change from white or green before freezing to red or black respectively after freezing, or after freezing and thawing. Chroma is sometimes referenced as "intensity" or "saturation." "Value" is sometimes referenced as lightness.

Desirably the difference, or differences, in the hue, value and/or chroma of the color change is or are sufficient to provide a clear, distinct and unmistakable signal of freeze exposure. The color of the emulsion can be supplemented or modified by a background of appropriate reflectivity or color or by including a dye or other colorant in the color-changing emulsion additional to the first and second reactants employed.

Optical Density. Optical density "OD" as used herein is the log to the base 10 of the inverse of the incident light reflected from a sample. OD can be expressed by the formula $$OD_\lambda = \log_{10}(I_0/I)$$

where I is the intensity of light at a specified wavelength $\lambda$ that is reflected by a sample and $I_0$ is the intensity of the light before it enters the sample.

The color-changing emulsions shown in FIGS. 1 and 2 of the drawings will now be described.

Referring to FIG. 1, the color-changing emulsion shown, referenced 10, includes a dispersion medium 12, which can be water or another aqueous liquid, and two disperse phases, a first reactant phase 14 and a second reactant phase 16 dispersed, or distributed, in dispersion medium 12. First reactant phase 14 and second reactant phase 16 can be present as particles, some of which are referenced by the numerals 14 and 16, respectively, in FIG. 1. Generally, the individual particles of first reactant phase 14 are liquid at room temperature and also liquid at freezing temperatures. Generally also, the individual particles of second reactant phase 16, in this embodiment of the invention, are solid at room temperature and also at freezing temperatures. If relatively slow development of a color change is desired, the first reactant can be semi-solid. Usually, in embodiments of the invention such as are illustrated in FIG. 1, the particles of first reactant phase 14, and also of second reactant phase 16, are completely surrounded by, or enveloped by, dispersion medium 12.

A suitable volume of color-changing emulsion 10 can be incorporated in a freeze indicator to signal exposure to ambient freezing conditions. The freeze indicator can be associated with a host product to indicate exposure of the host product to a freezing temperature.

First reactant phase 14 can include a first reactant and a hydrophobic liquid. The first reactant can be a solid material that is dissolved or dispersed in the hydrophobic liquid. If desired, a solid first reactant can be dissolved and dispersed in the hydrophobic liquid, by including in the first reactant phase a surplus of the first reactant beyond what, if any, will dissolve in the hydrophobic liquid under the relevant conditions. In this case, the first reactant can be present in first reactant phase 14 as solute and as dispersed particles.

Alternatively, the first reactant can be a liquid compound or other liquid material, for example, a liquid that is miscible with the hydrophobic material and immiscible with dispersion medium 12. Some embodiments of the invention can employ a liquid first reactant as the first reactant phase, without the hydrophobic liquid being present in the first reactant phase as an additional entity. The first reactant can include more than one reactive substances or compositions.

In another embodiment of color-changing emulsion 10 according to the invention the first reactant is a hydrophobic liquid and first reactant phase 14 consists of, or consists essentially of, the first reactant and no additional hydrophobic liquid is employed in first reactant phase 14.

The first reactant can be a color precursor compound, or material, for example a dye precursor, or another suitable reactive material. Alternatively, the first reactant can be a colored material that loses color as a result of reacting with a color-depleting second reactant suitable for use in a freeze indicator emulsion. The first reactant can be oil soluble and, optionally, can be only sparingly water-soluble, or slightly water-soluble or entirely insoluble in water.

Reference herein to a color precursor is intended to include colored and other such suitable reactive materials, as well as colorless or light-colored materials, unless the context indicates otherwise. One example of a suitable dye precursor is the precursor form of the leuco dye crystal violet lactone. Other suitable color precursors are described elsewhere herein.

The hydrophobic liquid, if employed, can include any oil suitable as a solvent for the first reactant, for example a terphenyl oil. Other suitable oils and first reactant materials are described elsewhere herein.

Second reactant phase 16 can include a second reactant, which is a compound or material that can co-react with the first reactant to provide a color change or other desired signal. The color change can be development of a color, or removal, depletion or bleaching, of a color, or a change in hue. Either development of a color, or removal of a color, can be accompanied by a change in hue, if desired. An example of color development comprises a change from a light, or colorless, appearance to red, or black. An example of color removal, or lightening, includes a change from green or blue to a light, white, grey or transparent color. An example of a useful change in hue includes a change from green to red. Other useful color changes are described elsewhere herein. The color change can be contributed largely or entirely by the first reactant and the second reactant, with other components of the color-changing emulsion being colorless or substantially colorless.

The second reactant can include any suitable material which can react with the first reactant to yield a colored, or color-depleted, reaction product. For example, the first reactant can be a color precursor and the second reactant can be a color developer which develops the incipient color in the color precursor. The second reactant can be hydrophobic, oil soluble and, optionally, can be only sparingly water-soluble, or slightly water-soluble, or entirely insoluble in water, if desired.

The second reactant can be a liquid compound or other liquid material, for example, a liquid that is miscible with the hydrophobic material and immiscible with dispersion medium 12.

In another embodiment of color-changing emulsion 10, according to the invention, the second reactant is a hydrophobic liquid, and second reactant phase 16 consists of, or consists essentially of, the second reactant, and no additional hydrophobic liquid is employed in second reactant phase 16.

Reference herein to a color developer is intended to include other suitable materials which can react with the first reactant to yield a colored or color-depleted reaction product, unless the context indicates otherwise.

Some examples of suitable color developers include various organic acids, alkylphenolic resins, phenols, and hydroquinone derivatives. One embodiment of color-changing emulsion according to the invention employs a crystal violet lactone leuco dye color precursor and an alkyl phenolic resin color developer. Other suitable second reactants and other useful combinations of first reactants and second reactants are described elsewhere herein.

Either or both the first and second reactants can include more than one compound, or more than one material, if desired. One or more additional reactants can be included in color-changing emulsion embodiments of the invention, if desired, for example, an additional color-changing reactant can be included. Also, the roles of the first and second reactants can be reversed. For example, the second reactant can be employed in first reactant phase, in place of the first reactant. Also, the first reactant can be employed in second reactant phase, in place of the second reactant, if desired.

In the embodiment of color-changing emulsion 10 illustrated in FIG. 1, second reactant phase 16 consists, or consists essentially of, solid particles. Also, the solid particles can consist substantially, or wholly, of the second reactant, if desired, with no solvent for the second reactant, or other liquid, being present in the second reactant phase. Alternatively, second reactant phase 16 can consist, or consist essentially of, liquid particles, for example, as is described subsequently herein and is illustrated with reference to FIG. 2.

Color-changing emulsion 10 can include particles of either liquid first reactant phase 14, or solid second reactant phase 16, or of both reactant phases 14 and 16. Any or all of the particles in color-changing emulsion 10 can be colloidal, if desired.

Some embodiments of color-changing emulsion according to the invention include a liquid solvent, or liquid dispersion medium, for example, a hydrophobic liquid, in the first reactant phase and/or in the second reactant phase, in addition to the respective first reactant or second reactant. Some of these embodiments are described herein. However, the invention also includes embodiments of color-changing emulsion comprising particles of a first reactant and particles of a second reactant dispersed in an aqueous liquid medium without an additional liquid solvent or liquid dispersion medium being present in the particles. In such embodiments, one or both of the first reactant and the second reactant can be liquid, if desired.

Either first reactant phase 14, or second reactant phase 16, can include, or be constituted by, a material that is liquid at room temperature, or at an elevated formulation temperature up to about 100° C., and that is solid, desirably an amorphous solid, at a freezing temperature to be monitored, if desired.

Desirably, at least one of first reactant phase 14 and second reactant phase 16 is liquid at a freezing temperature to be monitored.

Crystal violet lactone leuco dye and some comparable leuco dyes can react with a suitable color developer to yield an intensely colored product. A substantial change in color intensity, or change in hue of an intense color, that is brought about by the color-changing reaction, can be useful for signaling exposure to a freezing temperature, particularly, but not exclusively, in small freeze indicators.

As shown in FIG. 1, second reactant phase 16 is unmixed with first reactant phase 14, prior to freeze exposure. Desirably, the color-changing emulsion can be configured to avoid particles of first reactant phase 14 coalescing undesirably with particles of second reactant phase 16 at ambient temperatures above freezing to avoid, or limit, premature color formation caused by reaction between the first reactant, in first reactant phase 14, and the second reactant, in second reactant phase 16.

Color-changing emulsion 10 can include a stabilizer component (not shown in FIG. 1) to help maintain stability of the emulsion and prevent premature coalescence of first reactant phase 14 with second reactant phase 16, if desired. The stabilizer component can be an individual emulsion stabilizing compound. Alternatively, the stabilizer component can include one or more additional emulsion stabilizing compounds. Optionally, the stabilizer component can include one or more additional compounds or materials providing additional functionality related to the stability of the emulsion, if desired.

Excess stabilization can yield an emulsion that does not readily destabilize and coagulate at a freezing temperature, and is unsuitable for use in a freeze indicator. Some stable emulsions can be frozen and thawed without collapsing, coagulating or coalescing. Accordingly, in some embodiments of freeze indicator according to the invention the stabilizer component can be configured to provide a metastable emulsion, rather than a highly stable emulsion. A useful metastable emulsion can be stable at ordinary room, and/or some higher temperatures, yet can coagulate, and then coalesce, upon freezing of aqueous dispersion medium 12. If desired, the stabilizer component can include one or more concentration-sensitive compounds to assist, or facilitate, coagulation of emulsion 10 as the emulsion freezes. For example, the stabilizer component can include a low-temperature destabilizer to assist in destabilizing the emulsion at freezing temperatures.

A stabilizer component, if employed, can be dissolved in dispersion medium 12, or if liquid, can be mixed with dispersion medium 12. Some suitable stabilizer components are described elsewhere herein.

Color-changing emulsion 10 can coagulate in response to exposure to a freezing temperature causing the color of the emulsion to change, providing a signal indicating the freeze exposure. Desirably, the color change is irreversible, and emulsion 10 does not revert to its original color upon thawing. Irreversibility is useful to provide a permanent indication of past exposure to a freezing temperature.

Desirably, coagulation of emulsion 10 in response to freezing causes first reactant phase 14 to coalesce irreversibly with second reactant phase 16. Upon coagulation, the solid second reactant comes into contact with the liquid first reactant phase enabling the liquid first reactant phase to coalesce around the solid second reactant particles. Such coalescence enables the first reactant in the first reactant phase, and the second react, to co-react at the interfaces between the first reactant phase and the second reactant particles, producing a color change.

For example, the first reactant can react with the second reactant at the surfaces of the second reactant particles.

Color-changing emulsion 10 can include one or more additional reactants, and/or other useful materials, if desired.

For example color-changing emulsion 10 can additionally include an ice nucleant, to assist coagulation, if desired. One suitable ice nucleant is a proteinaceous ice-nucleating material derived from a microorganism, specific examples of which will be described herein. Other ice nucleants can be employed, if desired, as will also be described herein.

In addition, color-changing emulsion 10 can include one or more emulsifiers or stabilizers, if desired. An emulsifier can be included to help emulsify the ingredients during manufacture, i.e. to help disperse hydrophobic liquid or solid particles in an aqueous liquid phase. A stabilizer can be included to help maintain, or stabilize the emulsion once the emulsion has formed. Some surfactants can perform both emulsification and stabilization functions and one or more such surfactants can be included in color-changing emulsion embodiments of the invention, if desired.

Color-changing emulsions, such as are illustrated in FIG. 1, can permit new color-changing reactions to be employed in freeze indicators. Some of the color-changing reactions employable include reactions between two hydrophobic reactants. The latter reactions include reactions providing substantial changes in color intensity which can yield an intense color or a bright color, or remove an intense color or a bright color. Other color-changing reactions which create or remove colors in a manner providing a distinct or pronounced visual change in a freeze indicator can also be employed.

Some embodiments of color-changing emulsion, and freeze indicator, according to the invention provide a mechanism enabling various reactions yielding pronounced color changes to or from strong, intense or bright colors, or other distinct optical characteristics, to be triggered by the onset of freezing of an aqueous dispersion medium to be employed to signal freeze exposure. Color-changing reactions, which can be employed to provide a strong optical signal in response to freezing, can be useful in configuring a small freeze indicator having a limited optical aperture. An intense color occurring in one state of the indicator but not the other, i.e. before freezing or after freezing, can facilitate observation of an indicator signal generated by a small freeze indicator.

Referring now to FIG. 2, where similar components to those shown in FIG. 1 have similar reference numerals, the embodiment of color-changing emulsion shown, referenced 20, is similar to color-changing emulsion 10 shown in FIG. 1, except for differences that are explicitly pointed out here, or are otherwise apparent from this disclosure. One difference is that in the FIG. 2 embodiment, the second reactant phase, here referenced 26, includes a liquid phase, the liquid phase including a solution of the second reactant in a second hydrophobic liquid. The second hydrophobic liquid can be either the same as, or different from, the hydrophobic liquid in which the first reactant is dissolved. This hydrophobic liquid can be referenced as the first hydrophobic liquid.

Alternatively, if the second reactant is liquid at room temperature, and liquid or sufficiently semi-solid to be coalescable at freezing temperatures, second reactant phase 26 can include, consist essentially of, or consist of, the second reactant, without a hydrophobic liquid being employed to dissolve or disperse the second reactant.

In some embodiments of color-changing emulsion 20, the second reactant phase 26 can also include particles of the second reactant dispersed in the solution of the second reactant in the second hydrophobic liquid. Second reactant phase 26 can include another hydrophobic liquid, for example a hydrocarbon diluent, if desired.

As illustrated in FIG. 2, color-changing emulsion 20 can include two distinct hydrophobic phases, first reactant phase 14 and second reactant phase 26 dispersed in a common dispersion medium, dispersion medium 12. The particles of first reactant phase 14, and also of second reactant phase 26, can be completely surrounded by, or enveloped by, dispersion medium 12.

Comparably with color-changing emulsion 10, which employs second reactant phase 16, color-changing emulsion 20 can include colloidal particles of liquid first reactant phase 14, or liquid second reactant phase 26, or of both reactant phases 14 and 26. Thus, some embodiments of color-changing emulsion 20 can include two reactive colloids, one reactive colloid including oily particles of first reactant phase 14 dispersed in aqueous dispersion medium 12 and the other reactive colloid including oily particles of second reactant phase 26 also dispersed in aqueous dispersion medium 12, intermingled with, and mostly separated from, the oily particles of the first reactant phase 14.

Second reactant phase 26 desirably is not directly mixed with first reactant phase 14, prior to freeze exposure. First reactant phase 14 and second reactant phase 26 desirably are mixed within color-changing emulsion 20 with the respective particles, or droplets, being separated one from another by a layer of dispersion medium 12, prior to freeze exposure.

Desirably, color-changing emulsion 20 can be configured also to avoid particles of first reactant phase 14 appreciably coalescing with particles of second reactant phase 26 at temperatures above freezing to avoid, or limit, premature color formation caused by reaction between the first reactant, in first reactant phase 14, and the second reactant, in second reactant phase 26.

If desired, color-changing emulsion 20 also can include a stabilizer component (not shown in FIG. 2) to help maintain the stability, or metastability, of the dispersion of liquid particles of second reactant phase in color-changing emulsion 20. Either or both of first reactant phase 14 and second reactant phase 26 can include a stabilizer component, if desired. The stabilizer component employed for stabilizing second reactant phase 26 can be the same as, or different from, the stabilizer component employed for stabilizing first reactant phase 14, if the latter is stabilized.

Color-changing emulsion 20 can coagulate upon exposure to a freezing temperature, leading to irreversible coalescence of second reactant phase 26 with first reactant phase 14. This coalescence brings the solution of second reactant in the second hydrophobic liquid into contact with the solution of first reactant in the first hydrophobic liquid, allowing the two reactants to mix and co-react, producing a color change. Intimate mixing of liquid reactants, which some embodiments of color-changing emulsion 20 can employ, can sometimes help promote a rapid color change.

In some cases, one or both of the first reactant phase and the second reactant phase can comprise the respective first reactant or second reactant dissolved in a hydrophobic liquid at a room temperature concentration that exceeds the solubility of the respective reactant in the hydrophobic liquid at a freezing, or near-freezing, temperature. In such cases the respective first reactant or second reactant may begin to crystallize, disrupting the action of a tabilizer, if present, and help the color-changing emulsion to coagulate.

The intensity of the color developed on coagulation and coalescence of color-changing emulsion 20 in a freeze indicator can be determined by several factors some of which are controllable by appropriate formulation of color-changing emulsion 20. Relevant factors may include the inherent intensity of the color developed by reaction of the first and second reactants, the quantity of colored, or color-depleted, reaction product that is developed, the respective concentrations of the reactants, and the thickness, or depth, of the color-changing emulsion 20 in the freeze indicator.

Color-changing emulsion 20 can be configured so that coalescence of a particle of first reactant phase 14 with a particle of second reactant phase 26 will bring the first reactant together with the second reactant in proportions that are approximately stoichiometric for the relevant color-changing reaction, if desired. For example, in preparing color-changing emulsion 20, the first reactant and the second reactant can be dissolved in a hydrophobic liquid or liquids in appropriate molar proportions, according to the color-changing reaction. Then the dispersing of first reactant phase 14 and second reactant phase 26 in dispersion medium 12 can be conducted to obtain disperse phase particles of approximately similar size. A person of ordinary skill in the art will understand that approximating stoichiometric proportions, for example, within a factor of about two, can be helpful in obtaining good color development. Desirably, the relative proportion of the second reactant to the first reactant does not vary from a stoichiometric proportion by more than an order of magnitude, although in some instances it could.

Also, a person of ordinary skill in the art will understand that similar considerations can be applied to color-changing emulsion 10 and that approximately stoichiometric proportions of the first and second reactants can usefully, although not necessarily, be employed in color-changing emulsion 10.

A suitable volume of color-changing emulsion 10 or 20 can be incorporated in a freeze indicator to provide a signal in response to exposure to a freezing temperature. The freeze indicator can be employed to monitor a host product and provide an irreversible indication of past exposure to a freezing temperature. Embodiments of color-changing emulsion 10 or 20 providing an intense color change are particularly suitable for employment in small freeze indicators having small indicator volumes which may have a low profile providing a relatively small thickness of emulsion. Emulsions having unduly low color intensity may give an unacceptably weak optical signal, if employed in a shallow indicator volume.

Referring to FIGS. 3 and 4, the freeze indicator shown, referenced 30, includes a substrate 32 supporting an envelope 34 which contains a volume of a color-changing emulsion 20. Color-changing emulsion 10, or another suitable freeze-indicating emulsion or dispersion, as described herein, can be employed in place of color-changing emulsion 20, if desired, and references herein to color-changing emulsion 20 are to be understood to include color-changing emulsion 10 or another suitable color-changing emulsion embodiment of the invention, unless the context indicates otherwise.

As shown, envelope 34 can be approximately circular. Alternatively, envelope 34 can have any other desired shape, for example, oval, hexagonal, square, rectangular, strip-like or ring-like. Envelope 34, as shown, includes an inner wall 36 and an outer wall 38 joined together by a ring of adhesive 40, or in another suitable manner, for example by fusing. Alternatively, envelope 34 can be a one-piece sealed sac. Inner wall 36 of envelope 34 can be adhered to, deposited on, or otherwise attached to substrate 32 so as to attach envelope 34 to substrate 32. Alternatively, substrate 32 can provide inner wall 36 as an integral component of the substrate. For example, inner wall 36 can include a layer, or insert, of aluminum or other material substantially impermeable to water vapor and aqueous liquids, formed integrally with substrate 32 or as a separate element.

Outer wall 38 of envelope 34 includes a transparent zone (not referenced) which can occupy approximately the entire footprint of envelope 34 on substrate 32, if desired. Alternatively, the transparent zone of outer wall 38 can occupy a smaller area. The transparent zone enables an optical signal generated by freeze indicator 30, for example, a change in color, to be received externally by a suitable instrument, by a human viewer, by a camera, by an optical detector, or in another suitable manner.

Optionally, outer wall 38 of envelope 34 can be provided with a color filter 41, for example, as a light-modulating coating of an ink, a lacquer, a paint, or another suitable coating material on outer wall 38. Color filter 41 can be transparent to enable the appearance of the color-changing emulsion to be viewed through the filter. Though shown on outer wall 38 of envelope 34 in FIG. 4, color filter 41 could comprise a light-modulating coating of a coating material on an inner surface of envelope 34, if desired, provided that the coating material does not adversely affect the performance of the color-changing emulsion. Alternatively, color filter 41 can be provided by coloring outer wall 38, with a dye, pigment or other colorant incorporated into outer wall 38, or into another suitable emulsion containment or viewing member. As a further alternative, color filter 41 can comprise an additional structural element formed of colored plastic or the like, which can be laminated to outer wall 38, or can be included in the freeze indicator in another manner, for example, a cover extending over color-changing emulsion 20.

In one embodiment of the invention color filter 41 has a transparent green color, color-changing emulsion 20 is light-colored before freezing, and is dark-colored or black after freezing, so that the freeze indicator shows a change from green to dark or black, after freezing. The color-changing emulsion described in Example 4 provides an example of a color-changing emulsion that can be employed for this purpose. The dark, post-freezing color can largely or completely obscure the green color of color filter 41 from view, providing an effective indicator signal.

Color filter 41 can comprise a dye, for example a transparent green dye such as indocyanine green, dissolved in dispersion medium 12, if desired.

Envelope 34 can be entirely filled with color-changing emulsion 20. Alternatively, if desired, an air or gas bubble 42 can be included within the contained volume to provide a visual indication of whether the contained emulsion is in a liquid or a solid state. When the freeze indicator is tilted, or shaken, the gas bubble will not move if the emulsion is frozen.

Desirably, envelope 34 is constructed to prevent loss of water vapor from color-changing emulsion 20 and thus prevent premature drying out and malfunction of freeze indicator 30. For example, envelope 34 can be constructed to entirely enclose color-changing emulsion 20 with vapor block material. In one useful embodiment of freeze indicator 30, inner wall 36 and outer wall 38 of envelope 34 each include, or are constituted by, a layer of vapor block material, and are joined by a vapor block seal. One useful embodiment of freeze indicator 30 is constructed to avoid loss of water, or water vapor, so that no significant quantity of the freeze indicator dispersion medium is lost by leakage, during the intended life of freeze indicator 30, for example a period in the range of from about three months to three years, including periods such as six months, one year, or two years.

Optically opaque materials which can be used to prevent loss of liquid and water vapor from envelope 34 include metallic foil, or film, for example, aluminum, the reflectivity of which can also be optically useful in contributing to the optical signal generated by the freeze indicator.

Optically transparent materials which can be used to prevent loss of liquid and water vapor from envelope 34 include halogenated polyolefins such as, for example, polychlorotrifluoroethylene. If desired, a layer of a halogenated polyolefin material can be laminated with other polymers, for example structural polymers such as polyolefins, polyvinyl chloride, polyethylene terephthalates and ethylene-vinyl alcohol copolymers. Some other film materials which can be laminated in layers, if desired, include liquid crystal polymers, cyclic olefin polymers and copolymers, polyvinylidene dichloride. Some suitable film materials are available from Tekni-Plex, Inc., Somerville, N.J.

Envelope 34 can employ, or be largely, or entirely, constructed of vapor block materials having various moisture transmission rates depending upon the desired shelf life of the freeze indicator. For example, a material having a moisture transmission rate which is in a range of from about $0.1 \text{ g/m}^2$/day at a temperature of 38° C. (100° F.) and a relative humidity of 90% to not more than about $1.0 \text{ g/m}^2$/day at a temperature of 38° C. (100° F.) and a relative humidity of 90% can be employed. Materials having a moisture transmission rate of not more than about $0.1 \text{ g/m}^2$/day at a temperature of 38° C. (100° F.) and a relative humidity of 90% can also be employed, if desired.

Some further suitable vapor block materials which can be employed in envelope 34 are described in U.S. Pat. No. 7,571,695 the disclosure of which is incorporated by reference herein.

Substrate 32 can be, for example, a label, or a tag, and can furnish a part of, or be included by, freeze indicator envelope 34. Substrate 32 can be employed to secure freeze indicator 30 to a host product to be monitored, or to packaging for the host product, or to a bulk container for multiple host product units. Substrate 32 can bear a layer of pressure-sensitive adhesive, or can have other suitable means to attach freeze indicator 30 to the host product or to the bulk container or packaging. If desired, the layer of pressure-sensitive adhesive can be protected with a release liner prior to attachment. Also, freeze indicator 30, including substrate 32, if present, can be flexible to conform to a curved outer surface of the host product, the bulk container or the packaging, if desired.

Substrate 32 can provide an optical background to color-changing emulsion 20 which contributes to the optical properties of freeze indicator 30, if desired. For example, substrate 32 can have an outer surface (not referenced in the drawing) providing a light-reflecting background to color-changing emulsion 20. If color-changing emulsion 20 has appropriate optical properties, substrate 32 can reflect light through color-changing emulsion 20 before or after freezing. The background provided by the outer surface of substrate 32 can be colored, or bear printed or other indicia, or can be colored and bear indicia. The indicia and/or coloring, if employed can have any desired pattern or configuration.

Freeze indicator 30 can include a reference area proximate to color-changing emulsion 20 in envelope 34 which has an appearance similar to an end point of freeze indicator 30 or has another appropriate graphic character which can facilitate reading the freeze indicator signal, if desired. Optionally, such a reference area can be printed on or otherwise applied to the freeze indicator substrate 32, if employed.

Some embodiments of freeze indicator 30 include an envelope 34 providing a container for a fluid indicator dispersion such as color-changing emulsion 20. Envelope 34 can have an opaque inner wall 36 and a transparent outer wall 38 and can be sealed against water vapor and liquid loss. In some embodiments, inner wall 36 can be described as a bottom of freeze indicator 30 and outer wall 38 can be described as a top. Outer wall 38 of such embodiments of freeze indicator 30 can include a transparent polymeric film that optionally can be embossed to a suitable height for example up to about 0.2 mm Inner wall 36 can include a polymeric film and/or metallic foil and can also be a strong barrier to water vapor and optionally can be printable on its outer surface. In these embodiments, inner wall 36 can be sealed to outer wall 38, desirably without adding further thickness to the construction for example by employing heat-sealing, a pressure-sensitive or other suitable adhesive between inner wall 36 and outer wall 38. The adhesive can extend around the freeze indicator dispersion in a closed loop, if desired.

Color-changing emulsion 20 can be formulated to be transparent, or translucent, before freezing, if desired, permitting background colors and/or indicia, if present, on substrate 32 to participate in the optical signal generated by a freeze indicator incorporating color-changing emulsion 20. Some embodiments of color-changing emulsion 20, can provide transparency by preparing the emulsion to have an appropriate particle size. For example, some embodiments of color-changing emulsion 20 can employ particles having an average particle size of from about 50 nm to about 100 nm, and can be termed a "microemulsion", if desired. By employing a color precursor solution and a color developer solution that both have colorless components, the emulsion particles can be made colorless, so that such embodiments of color-changing emulsion 20 will appear to be transparent or translucent.

Some other embodiments of color-changing emulsion 20 can employ particles having a larger size, if desired. For example such color-changing emulsion embodiments can have an average particle size of about 700 nm, or greater, and can be opaque due to light scattering. By employing a suitable colorless, white, or light-colored, color precursor solution, a color-changing emulsion 20 that appears white or light-colored before freezing, and which becomes intensely colored after freezing can be prepared. Such embodiments of color-changing emulsion 20 can employ a complementary color developer solution. The intense color can develop following freeze-induced coalescence of the color developer solution with the color precursor solution.

In one embodiment of freeze indicator 30, which employs a transparent color-changing emulsion 20, the initial appearance of the indicator can be green, or can have another desired color or appearance and can have the shape of a check or tick or other desired mark or indicium. This appearance can be achieved by printing or other suitable marking on a background such as that provided by the outer surface of substrate 32 which can be viewed, or detected, through color-changing emulsion 20. Surrounding areas of the background can contrast with the check or other mark, for example by being a light color such as white or metallic. By formulating color-changing emulsion 20 to become a suitably intense color after freezing, or to become opaque, the background check mark image can be obscured by the developed color when the indicator has been exposed to freezing conditions so that the indicator displays a dark disk and no check mark is visible. Such an embodiment of freeze indicator 30, by changing from a green check mark to a dark or black dot or disk, can provide a clear and distinct indication of freeze exposure.

Another embodiment of freeze indicator 30 employs particles of first and second reactant phases 14 and 16 of sufficient size, for example, an average particle size of greater than about 300 nm, to provide an opaque appearance. Employing first and second reactants that are light colored together with other colorless or light-colored ingredients, color-changing emulsion 20 can be opaque and can have a light colored initial appearance. By employing first and second reactants that co-react to produce a relatively strong or intense color a strong or dark appearance can be obtained after freezing. Such an embodiment of freeze indicator 30 can also provide a clear indication of freeze exposure.

If desired, a light colored emulsion 20 can be colored green by including a small quantity of a green dye or a green pigment mixed in with one or other of the dispersed reactant phases 14 and 16, or dissolved or dispersed in the aqueous dispersion medium. The green colorant can enhance the message communicated by the initial appearance that an associated host product probably has not been exposed to a freezing temperature and is accordingly safe, or "OK", in this respect. Other appearance changes that a freeze indicator 30 including a color-changing emulsion 20 can exhibit will be known or apparent to a person of ordinary skill in the art, in light of this disclosure, or will become known or apparent in the future, as the art develops.

Freeze indicator 30 can have any desired size and can be configured in relatively small and thin embodiments, if desired. For example, freeze indicator 30 can have a small indicator volume, for example less than 10 μl, less than 5 μl or less than 1 μl. Small embodiments of freeze indicator 30 can be suitable for inclusion in, or for application to, small packages, boxes or items which can be processed in large numbers at high speeds, for example, vaccine vials, vaccine syringes, and medication containers.

Thickness of the Emulsion

Freeze indicator 30 can have any one of a variety of thicknesses between inner wall 36 and outer wall 38 across the envelope 34 in which color-changing emulsion 30 is accommodated. Embodiments of freeze indicator such as shown in FIGS. 3-4, can usefully be supported on the surface of a host product to present an apparently two-dimensional appearance of color-changing emulsion to the viewer. The dimension of the envelope 34 in the transverse direction, which would be the viewing direction in such an embodiment, is referenced herein as the "thickness" of freeze indicator 30. Desirably, the thickness of the emulsion in freeze indicator 30 is adequate for color-changing emulsion 20 to exhibit a change in color intensity before and after freezing that is sufficient to provide a clear indicator signal. Generally, for a given emulsion, the color intensity can be increased by increasing the freeze indicator thickness. Freeze indicator 30 can have a thickness up to about 10 mm, or greater, if desired.

However, some embodiments of freeze indicator 30, can have a relatively low profile, having a relatively small thickness, for example a thickness of less than about 0.5 mm, less than about 0.3 mm, less than about 0.2 mm, or less than about 0.1 mm Small, ultra-compact or miniaturized embodiments of freeze indicator 30 can be useful for certain freeze indicator applications, or for manufacture in certain mass production processes, or for both. For example, small freeze indicators can be useful for application to small host products, for their small footprint on a label or a package, and/or for economy of manufacture.

Some useful small embodiments of freeze indicator 30 can have a thickness, or emulsion thickness, of from about 10 μm (micron,) to about 0.3 mm, for example up to about 30 μm (0.03 mm), or another suitable emulsion thickness. Such freeze indicator embodiments can employ a suitably intensely colored emulsion 20, as described herein, to provide a clear optical signal when the color of the emulsion changes in response to freeze exposure.

For example, an embodiment of color-changing emulsion 20, employing a suitable color precursor and a suitable color developer can produce a color change of at least 0.4 OD or 0.5 OD from an emulsion thickness of less than 0.2 mm. Other embodiments of the invention can produce such a color change from an emulsion thickness of less than 0.1 mm, or of less than 0.05 mm. Further useful embodiments of color-changing emulsion according to the invention can provide a color change in response to freeze exposure of at least 0.2 OD from an emulsion thickness of 0.2 mm or less. Such embodiments of color-changing emulsion 20 can employ a leuco dye precursor in a proportion of at least about 5 percent by weight, together with a suitable color developer, if desired.

The freeze indicator illustrated in FIG. 4A, referenced 44, can be generally similar to that shown in FIGS. 3 and 4 with the modifications that will be apparent from the following description. Freeze indicator 44 comprises an upper blister portion 45 and a lower substrate portion 46. Blister portion 45 comprises a central dome and a peripheral skirt extending around the dome. The central dome defines with substrate portion 46 an indicator volume 47, which can contain a freeze-responsive indicator fluid, for example, a color-changing emulsion embodiment of the invention. The central dome can be preformed from a synthetic polymeric film material, for example polyvinyl chloride and can have a circular shape, or another desired shape, in plan view. The peripheral skirt can be formed in one piece with the central dome from the same material and can be relatively rigid or can be substantially flexible. Substrate portion 46 can be rectangular, or have another desired shape and can also be rigid or flexible. Optionally, substrate portion 46 can be coated with an adhesive on its underside, for attachment to a host product, and the adhesive can be covered with a protective liner, which is removed prior to attachment. The peripheral skirt of blister portion 45 can be sealed to substrate portion 45 in any suitable manner, for example, by heat sealing or by use of an adhesive. Alternatively, blister portion 45 and substrate 46 can be formed in one piece. Freeze indicator 44 can be flexible, if desired, for example sufficiently flexible that substrate portion 45 can be curved into a semicircle or a circle.

The central dome of blister portion 45 can be optically clear, or transparent, or otherwise light-transmissive and, optionally, can be coated, or otherwise provided, internally and/or externally, with an auxiliary light-modulating material, such as a colored ink. For example, freeze indicator 44 can include a color filter such as color filter 41 (FIG. 4).

Freeze indicator 44 is suitable for embodying in a variety of configurations, including relatively small configurations. One illustrative example of a small embodiment of freeze indicator 44 has a blister diameter (or equivalent dimension) of about 4 mm, a blister height (the vertical dimension in FIG. 4A) of about 0.6 mm, and an indicator volume of about 5 μL. Another example of a larger embodiment of freeze indicator 44 has a blister diameter (or equivalent dimension) of about 12 mm, a blister height (the vertical dimension in FIG. 4A) of about 1.2 mm, and an indicator volume of about 80 μL.

To facilitate volume manufacture of freeze indicator 30, a multiplicity of freeze indicators 30, including substrates 32, if employed, can be manufactured as an array on sheet stock or a continuous web, if desired.

Freeze indicators such as suitable embodiments of freeze indicator 30 can be manufactured in high volume using blister pack machines or other suitable methods. In one such method, freeze indicators can be supplied as individually die-cut items mounted with pressure sensitive adhesive on continuous lengths of release liner in sheet or roll form, for example as self-wound rolls. The sheets or rolls of freeze indicator can be manipulated in a manner comparable with the application of labels and can be applied to suitable surfaces using appropriately modified mechanical label applicators.

Some suitable freeze indicator containers that can be used with color-changing emulsion 20 are described in U.S. Pat. No. 7,571,695 to Taylor et al. as containing an indicator dispersion. Such freeze indicators can be manufactured in various ways, for example, on a blister packaging machine. Small embodiments of freeze indicator 30, having modest thickness, can be manufactured by employing rotary forming of blister cavities, rather than by a more cumbersome step and repeat process, if desired.

Some methods for making color-changing emulsions embodiments of the invention, that are useful in freeze indicators, will now be described. The methods according to the invention that are described herein, or one or more steps of the methods, can be practiced at a room temperature in the range of about 20° C. to about 25° C., unless the context indicates otherwise or suggests otherwise. As will be known or apparent to a person of ordinary skill in the art, in light of this disclosure, or will become known or apparent in the future, as the art develops, in many cases the temperature at which a method, or method step, is carried out can be varied without adversely affecting the outcome of the method or method step, for example, by 10° C., or more.

Referring to FIG. 5, the method illustrated is suitable, inter alia, for making color-changing emulsion 10 and other color-changing emulsions including color-changing emulsions comparable with, or similar to, color-changing emulsion 10. The illustrated method includes a step 51 of dissolving a first reactant 50 in a hydrophobic liquid 52, which can function as a carrier for first reactant 50, to provide first reactant phase 14. The method further includes a step 55 of dispersing first reactant phase 14 in a first dispersion medium 54 to provide a first reactant emulsion 56. The first dispersion medium can be an aqueous liquid such as one of the aqueous dispersion media described herein.

Step 55 can include agitating the mixture of first reactant phase 14 and first dispersion medium 54 with appropriate equipment, and for a period sufficient to produce a first reactant emulsion 56 having dispersed particles of first reactant phase 14 of a desired particle size. Suitable agitation methods and equipment will be known or apparent to a person of ordinary skill in the art, in light of this disclosure. Other suitable methods and equipment may become known or apparent in the future, as the art develops. For example, suitable agitation can be effected with high shear, by high speed mixing, by ultrasonication or by forcing the fluid under pressure though small holes.

The illustrated method also includes a step 59 of dispersing second reactant phase 16 in a second dispersion medium 58 to provide a second reactant dispersion 60. The method can include agitating a mixture of second reactant phase 16 and second dispersion medium 58 to provide the second dispersion in the same manner as described for first reactant emulsion 56. To make color-changing emulsion 10, second reactant phase 16 can include solid particles of the second reactant. Alternatively, second reactant phase 16 can include a solution of the second reactant in a hydrophobic liquid. Optionally, second reactant phase 16 can consist of, or consist essentially of particles of reactant phase 16, or of a solution of reactant phase 16.

Desirably, second dispersion medium 58 is an aqueous liquid and the aqueous liquid employed for the second dispersion medium 58 can be the same as, or different from, the aqueous liquid employed for first dispersion medium 54. Desirably also, the first and second dispersion media, if they are different aqueous liquids, are mutually miscible. As already stated, the first reactant and the second reactant can be co-reactable to provide a color change.

The method illustrated in FIG. 5 can further include a step 62 of mixing second reactant dispersion 60 with first reactant emulsion 56 in suitable proportions to provide color-changing emulsion 10. Desirably, the mixing is conducted so as to avoid destabilizing or collapsing either first reactant emulsion 56 or second reactant dispersion 60. The proportions can be selected to provide good color development in color-changing emulsion 10 having regard to the respective concentrations of the various ingredients.

Pursuant to the described method, first dispersion medium 54 can mix with second dispersion medium 58 to yield a homogenous aqueous phase. Particles, or vesicles, of the first reactant emulsion 56 and solid particles of the second reactant, the latter constituting second reactant phase 16, are dispersed in this homogenous aqueous phase. Thus, the resultant color-changing emulsion 10 comprises a three-phase system, as was described with reference to FIG. 1.

Color-changing emulsion 10 can respond to a suitable freezing temperature, for example, a temperature in the range of from about +2° C. to about −5° C., or in the range of from about 0° C. to about −2° C., by coagulating. Coagulation can be accompanied by, or followed by, coalescence of the droplets of first reactant phase 14 with the particles of the second reactant, which droplets and particles were suspended in color-changing emulsion 10 prior to freezing. Upon coalescence, droplets of first reactant phase 14 can spread over and wet the second reactant particles enabling the first reactant and second reactant to co-react and change the color of color-changing emulsion 10 by adding color to, or removing color from the emulsion.

Figure 6:
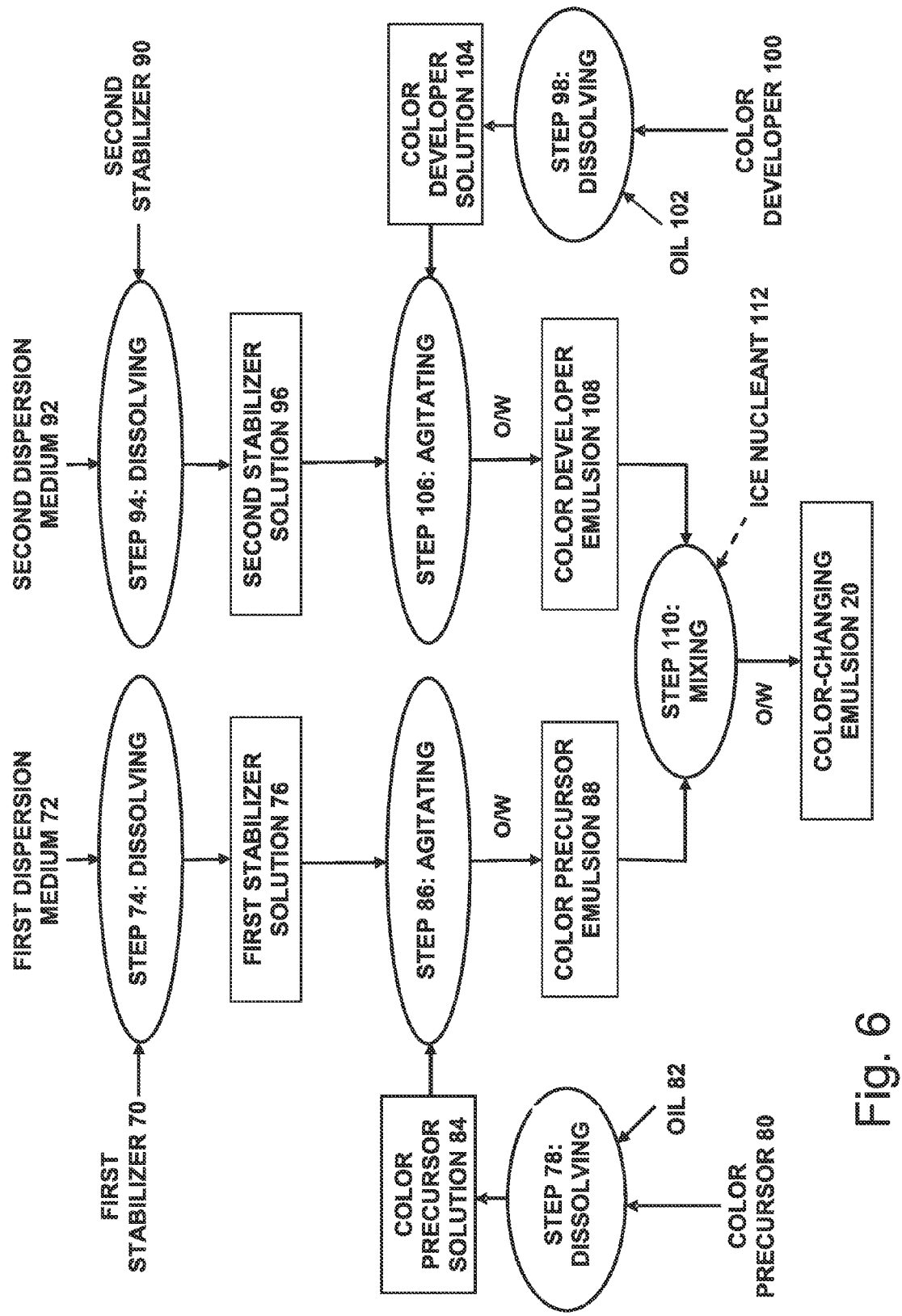
FIG. 6 is a block flow diagram of another illustrative embodiment of a method according to the invention of making a color-changing emulsion, for example, the color-changing emulsion illustrated in FIG. 2.

Referring to FIG. 6, the method illustrated is suitable, inter alia, for making color-changing emulsion 20 and other color-changing emulsions, including color-changing emulsions comparable with, or similar to, color-changing emulsion 20. Details of this method that are not explicitly described can be understood to be similar to the details set forth in the description of the method illustrated in FIG. 5, if appropriate, or will otherwise be known or apparent to a person of ordinary skill in the art, in light of this disclosure.

The method illustrated in FIG. 6 includes a step 74 of dissolving a first stabilizer component 70 in an aqueous first dispersion medium 72 to form a first stabilizer solution 76.

The method also includes a step 78 of dissolving a color precursor 80 in a suitable hydrophobic oil 82, in which color precursor 80 is soluble, which oil can function as a carrier for color precursor 80, to form a color precursor solution 84.

The method further includes mixing of first stabilizer solution 76 and color precursor solution 84, and a step 86 of agitating the mixture to emulsify it and disperse liquid particles, or droplets, of the oily color precursor solution 84 in the aqueous first stabilizer solution 76, thereby forming a color precursor emulsion 88 as an oil-in-water emulsion. First stabilizer 70 can be selected for its ability to emulsify and stabilize color precursor emulsion 88 and can include a single compound or multiple compounds. Optionally, first stabilizer component 70 can include a low-temperature destabilizer and/or one or more other compounds providing additional emulsion-stability-related functionality.

Agitating step 86 can be conducted to provide color precursor emulsion 88 with oily particles of color precursor solution 84 having a desired size, for example, by agitating the emulsion ingredients with sufficient vigor and for a sufficient duration to yield a desired particle size, according to the ingredients employed in a particular formulation.

In addition, the method illustrated in FIG. 6 includes dissolving a second stabilizer component 90 in an aqueous second dispersion medium 92, step 94, to form a second stabilizer solution 96.

The method also includes a step 98 of dissolving a color developer 100 in a suitable hydrophobic oil 102 in which color developer 100 is soluble, and which can function as a carrier for color developer 100, to form a color developer solution 104.

The method further includes mixing of second stabilizer solution 96 and color developer solution 104, and a step 106 of agitating the mixture to emulsify it and disperse liquid particles, or droplets, of the oily color developer solution 104 in the aqueous second stabilizer solution 96, thereby forming color developer emulsion 108 as an oil-in-water emulsion. Second stabilizer 90 can be selected for its ability to emulsify and stabilize color developer emulsion 108 and can include a single compound or a mixture or blend of multiple compounds, if desired. Second stabilizer 90 can be different from first stabilizer 70 or can be employed in a different proportion from first stabilizer 70, if desired, or may be the same.

Agitating step 106 can be conducted to provide color developer emulsion 108 with oily particles of color developer solution 104 having a desired size, for example, by agitating the emulsion ingredients with sufficient vigor, and for a sufficient duration, to yield a desired size, according to the ingredients employed in a particular formulation.

Steps 94, 98 and 106 can be performed in a similar manner to steps 74, 78 and 86 unless the context, or the different materials employed, indicate otherwise.

The method includes a further step, step 110, of mixing color precursor emulsion 88 with color developer emulsion 108 to yield color-changing emulsion 20, also as an oil-in-water emulsion.

Desirably, the mixing is conducted so as to avoid destabilizing or collapsing either color precursor emulsion 88 or color developer emulsion 108. Color precursor emulsion 88 and color developer emulsion 108 can be mixed in a ratio appropriate to obtain good development of color upon coagulation and coalescence induced by freezing of the resultant mixed emulsion, color-changing emulsion 20. The ratio of color precursor emulsion 88 to color developer emulsion 108 can be determined or adjusted according to the concentration of each reactant in the respective oil 82 or 102 and the concentration of the reactant particles or droplets in each respective emulsion 88 or 108.

Desirably also, the dispersed phase ingredients of at least one of color precursor solution 84 and color developer solution 104, are such that the respective solution is liquid at the expected freezing temperature of the color-changing emulsion 20, for example a temperature between about 0° C. and −5° C., such as −2° C., to facilitate coalescence of the respective dispersed droplets after freezing and coagulation of color-changing emulsion 20. An inert hydrophobic liquid, or diluent, can be included in either color precursor solution 84 or color developer solution 104 to reduce the viscosity of the solution at the freezing temperature, if desired.

If employed, an ice nucleant, can be added to an ingredient or a mixture of ingredients at any suitable point in the method as described herein or as will be apparent to a person of ordinary skill in the art, in light of this disclosure. For example, an ice nucleant 112 can be added during step 110 during the mixing of color precursor emulsion 88 and color developer emulsion 108. Optionally, ice nucleant 112, if employed, can be added to the mixture after color precursor emulsion 88 and color developer emulsion 108 are blended. Alternatively, ice nucleant 112, can be added to a mixing vessel while color precursor emulsion 88 or color developer emulsion 108 is being added to the vessel. In one embodiment of the invention, the three ingredients, ice nucleant 112, color precursor emulsion 88, and color developer emulsion 108, are added to the mixing vessel more or less simultaneously, with stirring, or agitation.

Pursuant to the method described with reference to FIG. 6, first dispersion medium 72 can mix with second dispersion medium 92 to yield a homogenous aqueous phase. Particles, or vesicles, of oily color precursor solution 84 and particles or vesicles of color developer solution 104 are dispersed in this homogenous aqueous phase, and remain separated at temperatures above freezing. Thus, the resultant color-changing emulsion 20 can include a three-phase system, as was described with reference to FIG. 2. Ice nucleant 112, if present as solid particles dispersed in the aqueous phase of color-changing emulsion 20, can provide a fourth phase.

Color-changing emulsion 20 can respond to a suitable freezing temperature, for example, a temperature in the range of from about 2° C. to about −5° C., or in the range of from about 0° C. to about −2° C., by coagulating. Coagulation can be accompanied by or followed by coalescence of the droplets of color precursor solution 84 with droplets of color developer solution 104, which droplets of each kind are suspended in color-changing emulsion 20 prior to freezing. Upon coalescence, droplets of color precursor solution 84 can intermingle with droplets of color developer solution 104, enabling the color precursor and color developer to co-react and change the color of color-changing emulsion 20 by adding color to, or removing color from, the emulsion.

In some cases, the reaction of the color developer and the color precursor may not occur immediately because time may be required for the one reactant to diffuse into the other carrier liquid, intermingle and react. For example, the color intensity can sometimes take a few minutes to maximize. The reaction rate can be modified by configuration of the viscosities of the reactant solutions and of the concentrations and nature of reactants, if desired.

Figure 7:
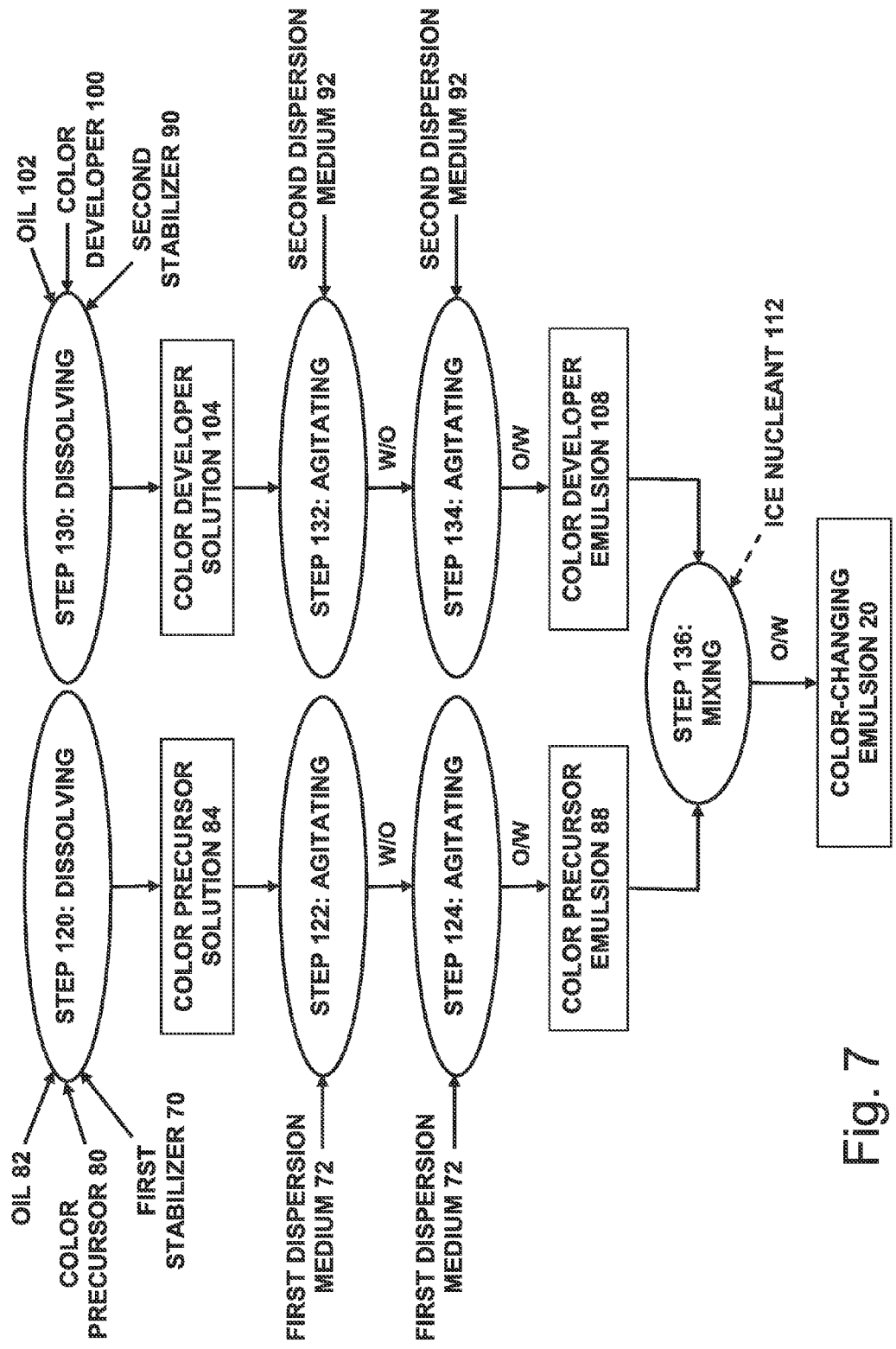
FIG. 7 is a block flow diagram of a further illustrative embodiment of a method of making a color-changing emulsion such as the color-changing emulsion illustrated in FIG. 2.

The method illustrated in FIG. 7 is generally similar to the method illustrated in FIG. 6 with the difference that the method includes making color precursor emulsion 88 by inverting a water-in-oil emulsion to form an oil-in-water emulsion. The illustrated method also makes color developer emulsion 108 in a similar manner The method illustrated in FIG. 7 can be employed for making color-changing emulsion 20, and other color-changing emulsions, including color-changing emulsions comparable with, or similar to, color-changing emulsion 10.

Referring now to FIG. 7, the method there illustrated includes a first step 120 of dissolving color precursor 80 and first stabilizer 70 in hydrophobic oil 80 to form color precursor solution 84.

First dispersion medium 72 is then added to color precursor solution 84 in two stages. In a first stage, agitating step 122, a portion of first dispersion medium 72 is added slowly to color precursor solution 80 while agitating the mixture at moderate speed with, for example, a homogenizer, to form a water-in-oil emulsion. The resultant water-in-oil emulsion can have an oily appearance and may exhibit the color, if any, of hydrophobic oil 80.

A slow rate of addition of first dispersion medium 72 is maintained until there is a sudden change in the appearance of the mixture from an oily appearance to white. The change is an inversion from a water-in-oil emulsion to yield an oil-inwater emulsion, namely color precursor emulsion 88. The inversion completes the first stage of the addition of the first dispersion medium 72.

In a second stage, the remaining quantity of first dispersion medium 72 employed can be added relatively quickly. The rate of agitation can be maintained, or adjusted. If desired, a so-called "breaker" surfactant can be dissolved in first dispersion medium 72, or added separately to the mixture prior to the inversion, to help the emulsion invert.

Color developer emulsion 108 can be prepared in a comparable manner, employing color developer 100, second stabilizer 90, oil 102 and second dispersion medium 92, via a dissolving step 130 to form color developer solution 104, agitating step 132 to form a water-in-oil emulsion and agitating step 134, to invert the water-in-oil emulsion and form an oil-in-water emulsion, color developer emulsion 108.

Using an inverse emulsion process, such as is described here with reference to FIG. 7, can sometimes help prepare color precursor emulsion 88 and/or color developer emulsion 108 in a consistent and reproducible manner In some instances, such inverse emulsion processes can be performed satisfactorily without employing a high speed homogenizer.

Color-changing emulsion 20 is then formed from color precursor emulsion 88 and color developer 108 in a mixing step 136, similarly to mixing step 110 of the FIG. 6 method, with the addition of ice nucleant 112, if desired. Other details of the method shown in FIG. 7 are similar to the details of the method shown in FIG. 6, or will be apparent to a person of ordinary skill in the art, in light of this disclosure.

The invention includes a color-changing emulsion produced by a method as described with reference to FIG. 5, FIG. 6, or FIG. 7 herein, or by another method described herein.

Various ingredients which can be employed in a color-changing emulsion embodiment of the invention will now be described. Other ingredients can be employed, as will be known or apparent to a person of ordinary skill in the art, in light of this disclosure, or will become known or apparent in the future, as the art develops.

Aqueous Dispersion Medium

The dispersion medium, for example, dispersion medium 12, employed in color-changing emulsion embodiments of the invention can include any suitable aqueous liquid. Thus the dispersion medium can include water and one or more other ingredients or can consist of, or consist essentially of, water. Desirably, the dispersion medium has a melting point related to a freezing condition to be monitored.

Water and many other liquids are prone to supercooling. Supercooling causes the freezing point of water to be lower than the melting point of water, i.e. the melting point of ice, which is 0° C. at standard pressure. The freezing point of water is the temperature at which the liquid phase changes to the solid phase (ice), while the melting point is the temperature at which the solid phase (ice) changes to the liquid phase. Supercooling can cause the freezing point of water to be depressed to −10° C. or lower.

To combat supercooling, and narrow the gap between the freezing point of the dispersion medium and its melting point, the dispersion medium can include one or more water-miscible liquids having a melting point higher than that of water, i.e. a liquid which melts at a temperature above 0° C., to raise the melting point of the dispersion medium, if desired. For example, the dispersion medium can include a suitable proportion of deuterium oxide, deuterated water or of a mixture of deuterium oxide and deuterated water.

Supercooling can also be combated by employing an ice nucleant, as is described elsewhere herein, if desired.

The terms "water" and "aqueous" are used in this specification to include "ordinary", common water, deuterium oxide, formula $D_2O$, also known as "heavy water", partially deuterated water, DHO, and mixtures of these forms of water, unless the context indicates otherwise. In ordinary water, the principal hydrogen isotope present is protium, which has an atomic number of one. In heavy water, the principal, or sole, hydrogen isotope present is deuterium, which has an atomic number of two. If it appears to be useful to distinguish between different forms of water, the term "light water" may be used herein to refer to common, ordinary water in which the predominant hydrogen isotope present is protium (although traces of deuterium may be present in light water, as is well known) and the term "heavy water" may used to refer to water which is predominantly or entirely deuterium oxide. Mixtures of deuterium oxide and light water may form deuterated water through hydrogen atom exchange.

Deuterium oxide has a melting point of 3.8° C., light water has a melting point of 0.0° C., and the freezing and melting points of light water/heavy water mixtures are generally related to the relative proportions of the two compounds in the mixture.

The proportion of deuterium oxide, deuterated water or of a mixture of deuterium oxide and deuterated water can be at least about 10 percent, at least about 50 percent, at least about 90 percent, at least about 95 percent, at least about 98 percent, at least about 99 percent, or approximately 100 percent by weight, the proportion being based upon the weight of the dispersion medium. These proportions are to be construed with the understanding that mixtures of deuterium oxide and light water may form deuterated water through hydrogen atom exchange.

If desired, the dispersion medium can consist essentially of, or consist entirely of, water. Also, the dispersion medium can consist, or consist essentially of deuterium oxide, i.e. the dispersion medium can be 100 percent deuterium oxide, if desired.

Deuterium oxide and deuterated water are also prone to supercooling. Accordingly, with or without deuterium oxide being present, the dispersion medium can include an ice nucleant to narrow the gap between the freezing point and the melting point of the aqueous liquid medium, if desired.

A desired activation temperature for freeze indicator embodiments of the invention can be provided by selection of a suitable proportion of deuterium oxide to include in the dispersion medium and by incorporation of a suitable ice nucleant in the dispersion medium. For example, the freeze indicator can have an activation temperature in the range of from about 1.0° C. to 0.0° C., from about 0° C. to −1° C., or from about −1° C. to about −2° C.

Some embodiments of dispersion medium useful in freeze indicator embodiments of the invention are devoid, or free, of any organic liquid. Other embodiments of dispersion medium useful in freeze indicator embodiments of the invention are devoid, or free, of any organic liquid capable of separating from the dispersion medium at freezing or above freezing temperatures, for example, at a temperature in the range of from about −10° C. to about 50° C.

Color-Changing Reactants

Color-changing reactants useful in practicing the invention include co-reactants that can react together, under the conditions prevailing in color-changing emulsion embodiments of the invention, to produce a distinct or pronounced color change, for example, the appearance or disappearance of a strong color. Color changes that provide a strong contrast between a never-frozen appearance of a freeze indicator and a freeze-exposed appearance can be produced, if desired. The color-changing reaction can be a chemical reaction, for example a pH-induced color change. Alternatively, the reaction can be a physical reaction providing a change in optical properties, for example a change from additive color mixing to subtractive color mixing. First reactant 14 and second reactant 16, and color precursor 80 and color developer 100, can be furnished by such co-reactants, or by other suitable materials, if desired.

Some suitable color-changing reactants include color precursors that can demonstrate significant differences in optical density upon exposure to a suitable color developer or other suitable exposure agent. The change can be, for example, a change from a light appearance before freezing to a dark appearance after freezing, or after freezing and thawing. Some examples of useful color precursors include dye precursors, for example precursor forms of leuco dyes in a colorless or weakly colored state, some silver compounds, and certain quinones. Some of these color precursors can yield intense color in a thin emulsion layer when developed, for example, in an emulsion layer having a thickness of 30 μm or less, or 20 μm or less.

Some useful characteristics of color-changing co-reactants include good oil-solubility and low water-solubility. Having a liquid state at freezing and ambient temperatures can also be useful.

Some dyes are known whose molecules can acquire two forms, one of which is colorless, or light colored and the other of which is colored, sometimes strongly colored. These dyes are usually called "leuco dyes." The term "leuco dye precursor" is used herein to refer to a colorless or light-colored form of a leuco dye. Some leuco dyes can change color when their environment changes from acidic to basic. Some other leuco dyes change color when their environment changes from basic to acidic. Thus, a leuco dye precursor can be converted to a colored form of the leuco dye by a suitable color developer. Some leuco dyes have an intense color and a light colored precursor. For example, colorless or slightly yellow crystal violet lactone precursor can be converted to an intense violet, or dark blue color, by using an acidic color developer.

In another example of color-changing co-reactants employable in the practice of the invention, an oil-soluble reducing agent, a color developer herein, can reduce a colorless silver compound, for example silver laurate, a color precursor herein, to elemental silver, providing a color change from colorless to a shade of gray or black.

Some further examples of color-changing co-reactants employable in the practice of the invention, include, on the one hand, color-changing, oil-soluble analytical reagents having low water-solubility such as can be used for colorimetric or spot analysis of substances, and on the other hand analytical target substances that can react with the analytical reagents to produce a color change. For example, the analytical reagent 2,6-dibromoquinone chlorimide can be co-reacted with a phenol to provide a color change from colorless to an intense blue color.

Additional examples of useful color-changing reactants include 2,3,5,6-tetrachlorocyclohexa-2,5-diene-1,4-dione and 1,3,3-trimethyl-3-methyleneindoline.

Examples of color-changing co-reactants employable in a color-changing emulsion 20 which is colored before freezing and which becomes colorless or light-colored after freeze-induced coagulation and coalescence, include: a colored material that is reversibly developable to have color, using a color developer; and a color-depleting agent that can reverse the color development reaction, decolorizing the colored material. Suitable such color changing co-reactants are further described elsewhere herein.

Various nonlimiting illustrative examples of color precursors and color developers which can be employed in the practice of the invention will now be described.

Color Precursors

As stated, some color precursors that can be employed in the practice of the invention include colorless or lightly colored materials such as silver salts and leuco dye precursors that can be converted to colored or even highly colored compounds or forms of the precursor compound.

Some silver compounds useful as color precursors include reducible, oil-soluble organosilver compounds, for example, silver carboxylates such as silver laurate, silver palmitate, and silver myristate. Oil-soluble organosilver compounds with low water-solubility, such as the aforementioned carboxylates, can be advantageous.

Some analytical reagents useful as color precursors include 2,6-dibromoquinone chlorimide. Other suitable analytical reagents will be known or apparent to a person of ordinary skill in the art, in light of this disclosure.

One example of a useful leuco dye precursor, as stated previously, includes crystal violet lactone. On development with a suitable leuco dye developer, examples of which are described elsewhere herein, crystal violet lactone forms a deep blue or violet color.

Some further examples of useful leuco dye precursors include products described as specialty magenta 20, ODB-1 and ODB-2 which are available from Emerald Hilton Davis, Cincinnati, Ohio and PERGASCRIPT® Red 16B available from BASF, Charlotte, N.C. Specialty magenta 20 and PERGASCRIPT® Red 16B produce an intense magenta color. Color precursors ODB-1 and ODB-2, upon development, become black.

Combinations of two or more mutually compatible color precursors can be employed. Combinations of crystal violet lactone and specialty magenta 20 can produce colors that can range from magenta to deep purple.

Useful dye precursors also include substantially colorless compounds having a skeletal lactone, lactam, sulfone, spiropyran, ester or amido structure, including triarylmethane compounds, bisphenylmethane compounds, xanthene compounds, thiazine compounds, spiropyran compounds, and the like.

Some additional specific examples of useful leuco dye precursors include benzoyl leuco methylene blue, malachite green lactone, 3,3-bis(p-dimethylaminophenyl)phthalide, and N-2,4,5-trichlorophenyl leuco auramine.

Some examples of useful leuco dye precursors that can react with a color developer to produce a red color include 3-diethylamino-6-methyl-7-chlorofluoran, and 3,6-bis(diethylamino)fluoran-γ-(4'-nitro)-anilinolactam.

Some examples of leuco dye precursors that can be employed in color-changing emulsion embodiments of the invention and their manufacture and that can react with a color developer to produce a black color include 3-diethylamino-6-methyl-7-anilinofluoran, and 3-(N-ethyl-N-isoamylamino)-6-methyl-7-anilinofluoran.

Some examples of useful leuco dye precursors that can react with a color developer to produce an orange color include 3-cyclohexylamino-6-chlorofluoran and 3-diethylamino-6,8-dimethylfluoran.

Still further useful leuco dye precursors are disclosed at column 3, line 28 to column 4, line 24 of U.S. Pat. No. 6,258,747 to Midorikawa et al., the disclosure of which is incorporated by reference herein, and at column 5, lines 16-61 of U.S. Pat. No. 6,514,909 to Austin et al., the disclosure of which is also incorporated by reference herein.

In the practice of the invention, the foregoing color precursors can be employed alone, or in combinations of two or more compatible compounds.

Use of a combination of color precursors, in suitable relative proportions, as a first reactant in color-changing emulsion 20 can provide a wide variety of colors from which to select a color for a particular application. For example, U.S. Pat. No. 4,842,976 to Sanders et al. describes at column 12, line 47 to column 14, line 10, the disclosure of which is incorporated by reference herein, various leuco dye color precursors which can react with a developer to yield respective yellow, cyan and magenta colors. As is well known, yellow, cyan and magenta colorants can be combined in various proportions to provide an extensive color gamut. Such combinations can be employed in color-changing emulsion embodiments of the invention.

To enhance coalescence upon freezing, color precursors employed in the practice of the invention desirably, but not necessarily, can be liquids or amorphous solids at the freezing temperature of a freeze indicator in which the color precursors are incorporated. Optionally, a color precursor employed in the practice of the invention can be a liquid or an amorphous solid at a temperature as low as 0° C., or −5° C., or −10° C. Desirably, second reactant phase 16 can be liquid if the color precursor is solid, or is likely to become solid, at a temperature to which the freeze indicator is intended to respond.

If desired, color precursors, or other first reactant materials that are expected to be solid at a temperature of interest can be preprocessed to be in a liquid or semi-solid state at the temperature of interest, before being incorporated in a color-changing emulsion according to the invention. One such method of preprocessing comprises dissolving two or more color precursors, for example, leuco dye precursors, in a common solvent and evaporating the solvent to yield an oily liquid color precursor composition. In some cases, as is known to a person of ordinary skill in the art, mixtures of dyes or dye precursors, prepared by evaporating a mixed solution of the dyes or dye precursors in a suitable solvent may fail to crystallize, as they would if dissolved and evaporated individually, becoming oily liquids instead of crystal precipitates.

The viscosity of the oily liquid color precursor composition, at the temperature range of interest for a particular freeze indicator, will depend upon the nature of the component color precursors, and the precursor mixture composition, as can be determined without undue experimentation. The precursor composition can have any suitable proportion of each component, for example, in the case of a two-component mixture, a proportion in a range of from about 10 percent to about 90 percent by weight, based upon the weight of the precursor composition. In the case of a mixture having three or more components, a proportion of each component in a range of from about 5 percent to about 60 percent by weight, based upon the weight of the precursor composition can be employed.

The viscosity of the oily precursor liquid mixture will usually increase with decreasing temperature, like other oily liquids. However, relatively more viscous mixtures that are difficult to process at room temperature can be emulsified at elevated temperature, if desired, by dispersion in a hot aqueous dispersion medium using a suitable emulsifier or dispersant system, for example at a temperature in the range of from about 50° C. to about 90° C. Upon cooling, the precursor mixture can be expected to form approximately spherical particles, rather than irregular solids as might be formed by crystallization of the unmixed, pure color precursor starting materials. Spherical first reactant phase particles are considered to be useful for the purposes of the present invention. Spherical particles generally can disperse reliably in a liquid dispersion medium, and can perform well in freeze indicator embodiments of the invention. Amorphous fluid particles of the first reactant phase can also be expected to coalesce well with particles of the second reactant phase and can thus be conducive to a rapid response to freezing when incorporated in a freeze indicator.

Color Developers

Substances or compositions that are useful as color developers in practicing embodiments of the invention generally can react with a color precursor to provide a color change and are compatible with the emulsion components employed.

For example, oil-soluble reducing agents such as oxalic acid, formic acid, ascorbic acid, phosphite esters, hydrohydroquinone, hydroquinone derivatives such as dimethyhydroquinone, di-tert-butyl hydroquinone, other dialkylhydroquinones and the like, and ferrous 2-hydroxypropanoate can be employed as color developers for silver salt color precursors useful in practicing the invention. Oil-soluble reducing agents with low water-solubility, for example, oxalic acid and dialkylhydroquinones, can be advantageous.

Also, some phenols with low water-solubility that can be employed as color developers that will react with 2,6-dibromoquinone compounds include 3-ethoxyphenol; 1,2-diethyl-3-hydroxybenzene; 1,3-diethyl-2-hydroxybenzene; and 2,2'-methylenebis(3,4,6-trichlorophenol).

Furthermore, oil-soluble or liquid primary and secondary amines having low water solubility, for example, 4-butyl-aniline, can be employed as color developers for 2,3,5,6-tetrachlorocyclohexa-2,5-diene-1,4-dione.

The color of a leuco dye precursor usually can be developed by a variety of compounds, some examples of which are phenol derivatives, organic acids and acid clays. Such compounds and compositions can be employed as color developers in the practice of the present invention, provided they are compatible with other emulsion components. One specific example of a useful acid clay color developer is FULA-COLOR™ XW, a reactive acid hectorite clay available from Rockwood Additives, Widnes, UK.

In some cases, polymeric resins can be employed. Some useful polymeric resins include phenolic resins, phenol-acetylene resins and polyvalent metallic salts of phenolic resins, phenol-acetylene resins. A specific useful color developer is HRJ 2053, a zinc-containing modified alkyl phenolic resin available from SI Group, Schenectady, N.Y.

Some further examples of materials useful as color developers in the practice of the invention include zinc salicylate, zinc salicylate resin, 4,4'-isopropylidenediphenol, also known as bisphenol A, 1,7-di(hydroxyphenylthio)-3,5-dioxaheptane, 4-hydroxyethyl benzoate, 4-hydroxydimethyl phthalate, monobenzyl phthalate, bis-(4-hydroxy-2-methyl-5-ethylphenyl)sulfide, 4-hydroxy-4'-isopropoxydiphenylsulfone, 4-hydroxyphenylbenzenesulfonate, 4-hydroxybenzoyloxybenzyl benzoate, bis-(3-1-butyl-4-hydroxy-6-methylphenyl)sulfone, p-tert-butylphenol, and polymers based on bisphenol A.

Some further examples of materials useful as color developers in the practice of the invention can be found at column 4, line 25 to column 6, line 29 of U.S. Pat. No. 6,258,747 to Midorikawa et al. and at column 4, line 17 to column 5, line 15 of U.S. Pat. No. 6,514,909 to Austin et al. The referenced disclosure of each of the Midorikawa et al. and Austin et al. patents is incorporated by reference herein.

If desired, a liquid second reactant can be employed in the practice of the invention. Some examples of hydrophobic materials that are liquid at a temperature useful for freeze indicators according to the invention, and which are also leuco dye developers include: liquid halogen substituted phenols; 4-bromo-2-fluorophenol; 2-bromo-5-fluorophenol; 2-chloro-5-fluorophenol; 2-chloro-6-methylphenol; liquid short-chain alkyl substituted phenols; 2-tert-butylphenol; 2-n-propylphenol; 3-n-propylphenol; liquid short chain ether phenols; 2-isopropoxyphenol; and 3 methoxy phenol;

Liquid hydrophobic leuco dye developers which can be employed also include mixtures of two or more halogen and/or short chain alkyl-substituted phenols having relatively low melting points, including: halogenated phenols having low melting points; 2-bromophenol (melting point about 5° C.); 2-bromo-4-methylphenol (melting point about 16° C.); short chain alkylated phenols with low melting points; 2-sec-butylphenol, (melting point about 10°-12° C.);

4-n-pentylphenol (melting point about 24° C.); 2,6-diisopropylphenol (melting point about 17°-18° C.); 2-isopropylphenol (melting point about 14°-16° C.); and 4-n-propylphenol (melting point about 20°-22° C.). An appropriate composition for such a leuco dye developer mixture, which will provide a second reactant that is liquid at a desired temperature and is effective for the purposes of the invention can be determined by a person of ordinary skill in the art without undue experimentation. A skilled person will also know, or be able to determine, other suitable leuco dye mixtures that can be employed in the practice of the invention.

A first reactant for use in an initially colored color-changing emulsion 20 can be the colored product of a reversible reaction of a color precursor with an appropriate color developer. This colored reaction product can give a color-changing emulsion in which the colored reaction product is incorporated, a colored appearance before freezing, which can be a strong, or intense, color, if desired. Such embodiments of the invention can employ a suitable proportion of a color-depleting agent as a second reactant. The color-depleting agent can deplete the color of the colored reaction product upon coalescence of a second reactant phase containing the color-depleting agent with a first reactant phase containing the colored reaction product, in any suitable manner, for example by reducing the effect of the color developer. The color-depleting agent can reduce the effect of the color developer by reversing or diluting color development, can act as a color suppressant, or can deplete the color of the first reactant in another suitable manner.

The color development of some leuco dyes can be reversed by providing a sink, or neutralizer, for the color developer. Thus, a useful first reactant employable in an initially colored color-changing emulsion 20 can be a leuco dye developed with an acidic color developer. One suitable second reactant to use with this first reactant is an alkali, for example a strong base which can act as a color-depleting agent by neutralizing the acidic color developer. For example, phenolphthalein can be developed with acid to have a strong pink color, and the acid can be depleted or neutralized, with alkali, to return the phenolphthalein dye to a colorless state.

Other developed leuco dyes, for example crystal violet lactone developed with a phenolic compound, can be employed in an initially colored color-changing emulsion 20 according to the invention, and can be similarly color depleted by an alkaline second reactant, reversing the color development of the leuco dye.

The color-depletion reaction may be concentration dependent, and the concentration of the second reactant can be selected to provide a suitable color change, if desired.

To help prevent premature discoloration of initially colored embodiments of color-changing emulsion 20 by limiting or preventing the second reactant from diffusing out of the second reactant phase particles, the second reactant can be an insoluble alkali, or other suitable insoluble material, if desired. Some examples of useful insoluble alkalis include materials such as a basic clay or finely ground insoluble basic mineral. Optionally, the clay or mineral can be derivatized with polyamine groups, with polyethyleneimine groups, with cationic groups, or with other suitable groups, to have a suitably basic character.

Alternatively, where the first reactant is a developed color precursor, the second reactant can be a developer diluent used in a proportion which, upon coalescence and mixing of the first emulsion with the second emulsion, reduces the developer concentration to become insufficient to cause color development.

Some physical properties that can be useful in the color precursor or the color developer or both the color precursor and the color developer include being essentially insoluble in water, for example being insoluble or only sparingly soluble in water, and being soluble in a suitable oil or other hydrophobic liquid.

The color precursor and the color developer can have comparable solubilities in the hydrophobic liquid, or respective hydrophobic liquids, if two component emulsions are employed in the color-changing emulsion.

Desirably, the physical properties of the color precursor and the color developer are both such that each is substantially retained within the particles in the disperse phase and do not migrate appreciably into the disperse phase. Desirably also, no significant quantity of either reactant is drawn from, or leaches from, the oil or other hydrophobic liquid present in the disperse phase particles, into the dispersion medium by the surfactant or other stabilizer component, if employed. In this context, a significant quantity of reactant usually will be a quantity that affects the color of the color-changing emulsion adversely before freeze exposure occurs, for example by prematurely coloring an initially colorless emulsion. The presence of a small quantity of a colorizing reactant may be acceptable so long as the color-changing emulsion can still undergo a significant change in appearance upon freezing, for example from a light color to a dark color.

Desirably, any surfactant or other stabilizer component, if employed, functions to emulsify the hydrophobic liquid, or the respective hydrophobic liquid, if two different liquids are employed, in the dispersion medium, rather than separately emulsifying either or both color-changing reactants as droplets of reactant in the dispersion medium, which droplets are constituted without a hydrophobic solvent. Other desirable characteristics of the stabilizer component are described elsewhere herein.

Color-Depleting Agent

Some examples of color-depleting agents that can be employed in the practice of the invention include water-insoluble, oil-soluble amines, such as octadecylamine, quinine, diethylbenzylammonium chloride, various guanidine and guanidine derivatives, and other organic amine derivates such as the decolorizing agents described in U.S. Pat. No. 3,916, 068 to Kohmura et al., and mixtures of two or more such amines The disclosure of U.S. Pat. No. 3,916,068 at column 3, line 24 to column 14, line 38, is incorporated by reference herein, with the understanding that references to "the present invention" in the incorporated description refer to the respective invention of U.S. Pat. No. 3,916,068 and not to the invention described herein. Other suitable color-depleting agents will be known or apparent to a person of ordinary skill in the art, in light of this disclosure, or will become known or apparent in the future, as the art develops.

Such color depleting agents can be used as co-reactants in a color-changing emulsion with, for example, developed leuco dyes such as crystal violet lactone, and other leuco dyes described herein, or with other colored first reactants.

Controlling Background Color

Usefully, to reduce the risk of undesired background color, a color precursor, if employed, can be selected to be insoluble, or essentially insoluble, in the dispersion medium. Small traces of color precursor dissolving or migrating into the dispersion medium may react and prematurely generate a background color in the freeze indicator before the freeze indicator is activated by freeze exposure, confusing the freeze indicator signal. Such a background color may be misinterpreted as signaling exposure to freezing, when in fact freeze exposure has not occurred. A color developer inhibitor can be included in the color-changing emulsion to control development of background color, as is described herein, if desired.

Some color-changing reactants may contain impurities that can produce an undesirable background color in an otherwise colorless or light-colored state of a color-changing emulsion according to the invention. For example, water-soluble impurities in an oil-soluble color developer or an oil-soluble color precursor may leach out of a hydrophobic phase into an aqueous dispersion medium, discoloring the emulsion. Also, some water-insoluble reactants contain water-soluble impurities which can be transported from one oil phase, through the aqueous phase of a color-changing emulsion embodiment of the invention, to the other oil phase, if a second oil phase is present. Such cross-contamination can cause partial color development of a color precursor, producing an undesirable background color.

To address this problem, and reduce background color formation, a solid, water-insoluble reactant such as a color developer, color precursor, or other first reactant or second reactant can be treated by washing with hot water to remove water-soluble impurities or other water-soluble components, before the reactant is used in a method embodiment of the invention.

For example, a pretreatment or purification method according to the invention can include bringing 1 part of water-insoluble reactant to a boil or to a near-boiling temperature with from about 2 parts to about 100 parts of water, referring to parts by weight, and discarding the water. Optionally, the mixture can include a small amount of a suitable surfactant, for example, from about 0.01 parts to about 0.1 parts by weight of a nonionic surfactant, to help disperse the reactant. The method can include repeating this washing step as many times as appears to be useful, for example, from one to five times. The method can also include allowing the final hot water-reactant mixture to cool to crystallize the reactant, separating the reactant, and drying and grinding the reactant to a powder. The method can further include incorporating the powdered reactant in a color-changing emulsion, as described herein, with the intent of reducing background color contamination.

Another method of reducing or controlling background color contamination in embodiments of color-changing emulsion 20 which utilize a color precursor and a color developer, is to employ a small concentration of developer inhibitor in first reactant phase 14 with the color precursor, to control possible premature development of color by the color precursor. A relatively large proportion of color developer can be employed in, or as, second reactant phase 16 so that when the phases mix, upon freezing, the color developer overwhelms the developer inhibitor, and the color development reaction can proceed, signaling freeze exposure.

Any suitable proportion of developer inhibitor can be employed, for example a proportion in the range of from about 0.1 percent to about 5 percent by weight based upon the weight of the color precursor. Any suitable excess of color developer over developer inhibitor can be employed, such as a weight of at least about 3 times the weight of developer inhibitor, for example, a weight of from about 3 times to about 100 times the weight of developer inhibitor.

Some examples of color developer inhibitors include water-insoluble, oil-soluble amines, such as octadecylamine, quinine, diethylbenzylammonium chloride, various guanidine and guanidine derivatives, and other organic amine derivates such as the decolorizing agents described in U.S. Pat. No. 3,916,068 to Kohmura et al., and mixtures of two or more such amines. Other suitable color developer inhibitors will be known or apparent to a person of ordinary skill in the art, in light of this disclosure, or will become known or apparent in the future, as the art develops.

This method of controlling background color formation utilizing a developer inhibitor can be employed as an alternative to, or together with, other such background color control methods that are described herein.

Hydrophobic Liquids

Various hydrophobic liquids can be employed in color-changing emulsion embodiments of the invention including, inter alia, natural oils and synthetic oils. Some useful hydrophobic liquids are water-immiscible or tend to repel, or not absorb, water, or have a lack of affinity for water. A hydrophobic liquid employed in the practice of the invention can be a hydrophobic liquid that is unreactive with either the first reactant or the second reactant.

Some useful natural and synthetic oils are suitable as solvents for one or more of the first and second reactants described herein.

By selecting as first and second reactants a dye precursor and a dye developer, or other suitable co-reactants, which have good oil solubility and low water solubility undesired development of color in the aqueous phase, or by migration from one reactant phase through the aqueous phase to the other reactant phase, can be controlled and, in some cases, avoided.

Desirably, a hydrophobic liquid employed in practicing the invention has physical characteristics such that the freezing point of a solution of the hydrophobic liquid, with either the first reactant or the second reactant, according to which reactant or reactants is employed in a color-changing emulsion, is lower than the freezing point at which the freeze indicator is expected to register or indicate freeze exposure.

Desirably also, the hydrophobic liquid is not volatile under anticipated conditions of use, for example, is not volatile at temperatures below about 70° C., or another suitable temperature, and is a liquid at a temperatures between about the freezing temperature of the dispersion medium and about 70° C. or another suitable temperature. The hydrophobic liquid can include a viscosity reducing agent, to reduce the viscosity of the hydrophobic liquid, or to maintain the hydrophobic liquid in a semi-solid or liquid state rather than a solid state, at the relevant freezing temperature of freeze indicator 30, if desired.

Some useful color-changing reactants, for example, leuco dyes and leuco dye developers, are soluble in oil and hydrophobic liquids and are only sparingly soluble or are insoluble in water.

Some examples of hydrophobic liquids useful as solvents for one or both of first reactant 14 and second reactant 16 are terphenyl oils and vegetable oils, including soy bean oil, cotton seed oil, linseed oil, rape seed oil, castor oil, sunflower oil, olive oil, canola oil, peanut oil, corn oil and other vegetable oils. A mixture of two or more of these or other suitable oils can be used and the individual oils or mixtures can be mixed with other solvents or diluents.

Some commercially available terphenyl oils, which are sometimes mixtures of a variety of isomers, have one or more properties suiting them for use as solvents for color-changing reactants employable in freeze indicator embodiments of the invention, such as reasonable cost, low toxicity, low, or extremely low, evaporation rates and high chemical stability. One suitable terphenyl oil is available under the product code MCS 2811 from Solutia, St. Louis, Mo.

Some further examples of hydrophobic liquids useful in the practice of the invention include weakly polar oils, weakly polar oils having a boiling point above about 170° C. for example, from about 180° C. to about 300° C., alkylated biphenyls, monoisopropylbiphenyl, dioctyl phthalate, dibutyl fumarate, castor oil, mineral oil, naphthenic mineral oils, and mixtures of two or more of the foregoing hydrophobic liquids. The term "weakly polar" is used herein to refer to oils having a Hansen polar solubility parameter of less than about 4. Solubility parameters for some oils can be found in, for example, "*Hansen Solubility Parameters: A user's handbook*", C. M. Hansen, 2000, CRC Press, ISBN 0-8493-1525-5. Also described in this reference is a method for estimation of solubility parameters that are not tabulated in the reference. This method can be used for the determination of the polar solubility parameter of an oil employed in the practice of the invention.

Some additional examples of useful hydrophobic liquids include silicone oils. The following compounds are some examples of suitable silicone oils which can be employed in the practice of the invention:

siloxanes, polysiloxanes, and chain polysiloxanes including methyl polysiloxane, methylhydrogenpolysiloxane, dimethylpolysiloxane, methylphenylpolysiloxane, tetra decamethyl hexasiloxane, octamethyl trisiloxane, and highly polymerized methyl polysiloxane;

cyclopolysiloxanes including decamethylpolysiloxane, dodecamethylpolysiloxane, tetramethylhydrogenpolysiloxane, octamethyl cyclotetrasiloxane, decamethyl cyclopentasiloxane, methyl polycyclosiloxane, and dodecamethyl cyclohexasiloxane;

modified silicones including fluorine-modified silicone, polyether-modified silicone, alkyl-modified silicone and acryl-modified silicone; and siloxane copolymers including dimethyl siloxane/methyl siloxane copolymer, dimethyl siloxane/methyl siloxane copolymer, dimethyl siloxane/methyl siloxane copolymer, dimethyl siloxane/methylcetyloxysiloxane copolymer.

The hydrophobic liquid can include a diluent to improve the solubility of the respective first or second reactants, or to increase the viscosity of the first or second reactant phases, if desired. The diluent can be any suitable liquid that is miscible with the color-changing reactant solvent, or solvent mixture, for example, mineral oil or deodorized kerosene.

Still further suitable hydrophobic liquids will be known or apparent to a person of ordinary skill in the art, in light of this disclosure, or will become known or apparent in the future, as the art develops.

Stabilizer Component

Some embodiments of the invention can include an emulsifier in the composition to help a mixture of an aqueous phase and a hydrophobic phase enter into an emulsified state. Some embodiments of the invention also employ a stabilizer to help prevent an emulsion from collapsing once the emulsion has been formed. Some materials, for example, some surfactants, that perform both functions, i.e. they can both emulsify and stabilize, also can be employed.

For many uses, a freeze indicator should remain stable at temperatures above freezing that are likely to be encountered by an intended host product during the so-called "shelf" life of the host product The term "shelf life" is used herein in relation to the host product to refer to the period from the time of manufacture of the host product, or release of the host product from the control of the manufacturer, to the time of sale or use of the host product, or to another desired time point, regardless of whether the host product is actually shelved during that time. Depending upon the conditions of storage and distribution, and anomalies that may occur during storage and distribution, such as proximity to storage facility heating systems or distribution vehicle engines, or sun exposure, or the like, elevated temperatures of 40° C., 50° C., or higher may be encountered. According to the intended host product, a freeze indicator may variously be required to have a shelf life of a few days or weeks, three or six months, one year, two years, or more.

To help serve their intended purpose, some freeze indicator embodiments of the invention desirably do not normally coagulate prematurely, i.e. prior to sale or use, or prior to another appropriate time point, yet can still respond efficiently to freeze exposure by coagulating and giving a clear optical signal at any time during the shelf life of the host product, and possibly for some time thereafter.

Accordingly, to help maintain the stability of the color-changing emulsion, freeze indicator embodiments of the present invention, such as freeze indicator 30, can employ a stabilizer component, if desired. The stabilizer component can include one or more stabilizer compounds and, optionally, can include a compound or compounds providing additional stabilization-related functionality, for example, assistance with low-temperature destabilization of the emulsion.

Emulsion stabilization at temperatures above freezing can be provided by a surfactant or other suitable stabilizer compound or compounds. Some suitable stabilizer compounds are described in International Publication No. WO 2010/014730, the entire disclosure of which is incorporated by reference herein, for example, at page 27, lines 6-17 and lines 24-28.

Low temperature destabilization can be provided by certain high molecular weight compounds or by a concentration-responsive destabilizing or coagulating agent, for example, an ionic compound or compounds, or by another compound or compounds, which can aid irreversible coagulation of the color-changing emulsion upon freezing.

Any suitable stabilizer component can be employed to maintain the stability, or metastability, of the dispersions of liquid particles of first or second reactant phases 14 or 16 in a color-changing emulsion 20, provided that the color-changing emulsion is able to coagulate and coalesce in response to freeze exposure. As described, the stabilizer component employed for stabilizing second reactant phase 16, if employed, can be the same as, or different from, the stabilizer component employed for stabilizing first reactant phase 14, if employed. As noted, second reactant phase 16 can include solid particles alone, without employing a hydrophobic liquid, if desired.

The stabilizer component can include a surfactant, or a mixture of surfactants, or another suitable stabilizer compound or compounds, if desired. Other suitable stabilizer compounds can be employed, as will be known or apparent to a person of ordinary skill in the art, in light of this disclosure, or will become known or apparent in the future, as the art develops.

Desirably, the stabilizer component has little or no affinity for, and does not react with, either the first reactant or the second reactant. Some surfactant materials, for example anionic surfactants, can act as a developer for certain leuco dye precursors. Thus, crystal violet lactone and special magenta 20 can both be developed by anionic surfactants. Use of such surfactants may adversely affect the quality of the freeze indicator signal, for example by reducing the contrast between the before-freezing appearance and the after-freezing appearance of the freeze indicator, and may therefore be undesirable.

In some cases, a particular surfactant can inhibit the color precursor or the color developer from reacting on mixing, for example by complexing with one or both of the reactants. In such cases, the intensity of the developed color may be inversely related to the weight proportion of surfactant compared to the reactants. A large excess of such a surfactant may prevent color development, and may therefore be undesirable. However, use of a small but effective quantity of the surfactant can allow for emulsion formation and permit color development.

Desirably, the surfactant or surfactants can be selected, or configured, to avoid interference with the proper functioning of the ice nucleant, if employed. For example, the quantity of surfactant employed can be limited to a proportion that will be largely held at the interface between the surfaces of the hydrophobic particles and the aqueous liquid medium, as can be determined by simple foaming tests such as are described elsewhere herein, or in another suitable manner. Alternatively, or in addition, some method embodiments of the invention can reduce the particle size of the emulsion and thus increase the emulsion surface area, to distribute excess surfactant dissolved in the aqueous dispersion medium at the interface. The particle size can be reduced in any suitable manner, for example, by high shear mixing using a high shear fluid processor such as a MICROFLUIDIZER® high shear fluid processor available from Microfluidics International Corporation. Newton, Mass.

To help avoid adverse interaction between a surfactant component of color-changing emulsion 20 and an ice nucleant, if present, the ice nucleant can be incorporated into the emulsion after the emulsion has been otherwise fully prepared, when the surfactant has had the opportunity to locate to the particle-dispersion medium interface, if desired.

The stabilizer component, if employed, can include one or more anionic surfactants, cationic surfactants, phosphate surfactants, zwitterionic surfactants, or non-ionic surfactants, or a mixture of one or more anionic surfactants, cationic surfactants, phosphate surfactants, zwitterionic surfactants, or non-ionic surfactants, if desired. As used herein, the term "non-ionic surfactant" includes surfactants that are sometimes referenced in the art as "nonpolar."

Surfactant molecules usually have a compact hydrophobic head and a long hydrophilic tail. The ionic descriptor of a surfactant usually refers to the net charge on the hydrophilic head of the molecule, "anionic" referring to the presence of a negative charge, and "cationic" referring to the presence of a positive charge, on the head of the molecule.

Some suitable anionic surfactants include surfactants having carboxylate, sulfate, sulfonate, phosphate or other suitable anionic groups and surfactants having combinations of two or more of the foregoing anionic groups. Some specific examples of useful anionic surfactants include, without limitation, sodium stearate, potassium stearate, sodium myristate, sodium oleate, sodium dodecyl sulfate, ammonium lauryl sulfate, sodium lauryl ether sulfate, sodium dodecyl 3-mole ether sulfate, sodium dodecyl sulfonate, sodium tetradecyl sulfonate, sodium hexadecyl sulfonate, sodium dodecyl benzene sulfonate, sodium bistridecyl sulfosuccinate, sodium dioctyl sulfosuccinate, sodium nonylphenol 2-mole ethoxylate sulfate, ammonium nonoxynol-4 sulfate, and bis(2-ethylhexyl) sodium sulfosuccinate. Some further examples of useful anionic surfactants include, without limitation: anionic surfactants available under the trademark TRITON from Dow Chemical Company, Midland, Mich., including QS series, CF series, X series surfactants; anionic surfactants available under the trademarks RHODAPON, RHODAPEX, RHODACAL, or RHODAFAC from Rhodia Inc (USA) Cranbury. N.J.; and AEROSOL® OT anionic surfactant from Cytec Industries Inc., West Paterson, N.J. Mixtures of any two or more of the anionic surfactants described herein and/or of any other suitable anionic surfactants also can be employed.

Some suitable phosphate surfactants include lecithins, derivatized lecithins, ethoxylated and nonethoxylated mono-, di- or triphosphoric esters, polymeric derivatives of ethoxylated and nonethoxylated mono-, di- or triphosphoric esters, potassium monolauryl phosphate, sodium dilauryl phosphate, sodium monomyristyl phosphate, alcohol ethoxylate phosphate esters and phosphate polyether ester surfactants available under the trademark TRITON including the surfactant available under product code H-55.

Some suitable zwitterionic, or amphoteric, surfactants that can be employed in the practice of the invention include betaine, lauryl amido propyl dimethyl betaine, dodecyl betaine, dodecyl dimethylamine oxide, cocamidopropyl betaine, coco amphoglycinate, sultaine, hydroxysultaine, imidazoline, aminoalkanoate, iminoalkanoate surfactants, lecithin, lecithin derivatives, and mixtures of two or more of the foregoing zwitterionic surfactants.

Some suitable cationic surfactants include primary, secondary, tertiary and quaternary amines, dodecyl trimethyl ammonium chloride, hexadecyl trimethyl ammonium bromide, cetylpyridinium chloride, polyethoxylated tallow amine, benzalkonium chloride, benzethonium chloride and mixtures of two or more of the foregoing cationic surfactants.

Some suitable nonionic surfactants include aliphatic compounds having hydroxyl, ether, ketone or ester groups, polymers of such aliphatic compounds, compounds having a hydrophilic glycerol, polyglycerol, sorbitan, carbohydrate or polyoxyethylene glycol moiety linked to a lipophilic fatty alcohol, fatty acid or isofatty acid moiety via one or more ester and/or ether bonds, fatty acid ethoxylates, sorbitan esters, sorbitan ester derivatives, sorbitan monolaurate, copolymers of poly(ethylene oxide) and poly(propylene oxide), fatty alcohols, cetyl alcohol, oleyl alcohol, addition products of from 0 to 30 mol of alkylene oxide, for example, ethylene oxide, propylene oxide, butylene oxide, onto a linear fatty alcohol having from about 8 to about 22 carbon atoms, onto a fatty acid having from about 12 to about 22 carbon atoms, onto an alkylphenol having from about 8 to about 15 carbon atoms in the alkyl group, and onto sorbitan esters; $(C_{12}-C_{18})$-fatty acid mono- and diesters of addition products of from 0 to 30 mol of ethylene oxide onto glycerol; glycerol mono- and diesters and sorbitan mono- and diesters of saturated and unsaturated fatty acids having about 6 to about 22 carbon atoms and optionally their ethylene oxide addition products; addition products of from about 15 to about 60 mol of ethylene oxide onto castor oil and/or hydrogenated castor oil; polyol and, for example, polyglycerol esters, including polyglycerol polyricinoleate and polyglycerol poly-12-hydroxystearate, liquid fatty acid esters, ethoxylated (PEG-10 polyglyceryl-2-laurate), nonethoxylated (polyglyceryl-2 sesquiisostearate), octylphenol (about .40 mol %) ethoxylate, and octylphenol (9-10) ethoxylate, Suitable non-ionic surfactants also include non-ionic surfactants available under the trademark TERGITOL from Dow Chemical Co., Midland, Mich., including TERGITOL 15-S-15. Mixtures of two or more of the foregoing nonionic surfactants and/or other suitable nonionic surfactants can also be employed.

Another group of surfactants or stabilizers that can be employed in a color-changing emulsion according to the invention includes small solid particles that are insoluble in the emulsion components and have partially hydrophobic surfaces. Some water-insoluble and oil-insoluble particles are hydrophilic owing to the presence of ionic or polar groups at the particle surface. A partially hydrophobic surface can be provided, for example, by coating the particles with a suitable hydrophobic material or precursor. The stabilizer particles can have an amphoteric character, if desired. Particles that are partially hydrophobic can function as emulsion stabilizers because they are partially wettable by both the hydrophilic and the hydrophobic liquid components of the emulsion. Thus, such particles can locate at the interface between the emulsion phases which occurs at the surfaces of the droplets in the emulsion helping to stabilize the emulsion by keeping the phases separate from one another. Emulsions stabilized with solid particles are sometimes known as "Pickering" emulsions.

Thus, a stabilizer component, if employed, can be, or can include, one or more Pickering emulsifiers, if desired. The Pickering emulsifier, or Pickering emulsifiers, can be employed alone or in combination with other suitable stabilizer or destabilizer materials. Some suitable Pickering emulsifiers include, without limitation, hydrophobically coated solid particles, that are chemically unreactive in a color-changing emulsion according to the invention, and have affinity for both an aqueous phase and a hydrophobic phase of the color-changing emulsion.

"Pickering emulsion" stabilizer particles useful in the practice of the invention desirably are relatively small and for example, can have an average particle size not more than about 2 micron (also "µm" herein.) or not more than about 1 µm. Stabilizer particles employed can also be sufficiently small to be transparent, for example, by having an average particle size of not more than about 100 nm, or not more than about 50 nm. To reduce the risk of interfering with the desired visual appearance of a color-changing emulsion, white or colorless stabilizer particles can be employed. Also, the stabilizer particles employed can be unreactive in the color-changing emulsion.

Such a solid stabilizer component can comprise any suitable material, for example, zinc oxide, titanium dioxide, crystalline silica, amorphous silica, hydrated silica, calcium carbonate, dolomite (calcium carbonate, magnesium carbonate), gibbsite (aluminum hydroxide), barite (barium sulfate), fluorite (calcium fluoride), hydroxyapatite, kaolinite, montmorillonite, talc, mica, halloysite, Janus particles, being particles having a hydrophilic area and a hydrophobic area on the same particle, and mixtures of two or more of the foregoing materials. Some suitable zinc oxide materials are available from Merck & Co. Inc., Rahway, N.J., under the trade name Zinkoxid neutral, and from Harcros Chemicals In., Kansas City, Kans. under the trade name NanoX.

Solid particles useful in a stabilizer component of a color-changing emulsion according to the invention can have any suitable size, for example, an average particle size of less than about 100 micron. Such solid particles can be of a size to be more or less transparent, for example by having an average particle size not greater than about 100 nm To avoid risk of interfering undesirably with the appearance of the color-changing emulsion, white or colorless, or light-colored solid particles can be employed, if desired.

A solid stabilizer component, if employed, can be hydrophobicized to a desired degree by coating particles of the solid stabilizer component with a hydrophobicizing agent, for example a suitable oil. Alternatively, the hydrophobicizing agent can be a compound or compounds which chemically bonds to the particle surface and forms a hydrophobic or partially hydrophobic coating, for example, an organometallate compound, a polysiloxane, or a functionalized silicon compound. Some examples of surface-binding coating agents include, but are not limited to organotitanates, isopropyl titanium triisostearate, methyl hydrogen polysiloxane, and methyltrimethoxyalkylsilane. Other examples can be found in U.S. Patent Application Publication No. 2008/0014233 to Schlossman et al., and U.S. Pat. Nos. 5,143,722; 5,756,788; and 5,587,148. The disclosure of each said patent or patent application is incorporated by reference herein. Further examples will be known or apparent to a person of ordinary skill in the art, in light of this disclosure, or will become known or apparent in the future, as the art develops. The hydrophobicizing process can be controlled to yield particles with limited hydrophobicity, for example by limiting the proportion of hydrophobicizing agent employed, or in another suitable manner.

As indicated, a stabilizer component, if employed in a color-changing emulsion according to the invention, can be, or can include, a mixture of surfactants, or other stabilizer compounds or materials. Portions of the stabilizer component can be added to the color-changing emulsion ingredients at different stages of the process, if desired, or the entire stabilizer component can be added at one time. Any given stabilizer component portion can be, or include, an individual surfactant, or other stabilizer, or destabilizer, as is appropriate for a particular stage of the process. Such a mixture of surfactants can employ surfactants of one type or of different types, for example, a nonionic and an anionic surfactant, or other selections of two or more surfactants from surfactant types such as nonionic, anionic, cationic, zwitterionic, amphoteric, and Pickering emulsifiers.

Also, a stabilizer component, if employed, can have a concentration in dispersion medium 12 that permits color-changing emulsion 20 to remain stable at ambient temperatures above freezing, and which permits irreversible coagulation of the emulsion at freezing temperatures.

A low-temperature destabilizer, if utilized, can include any material suitable for employment in a freeze indicator according to the invention to promote or enhance coagulation of the freeze indicator dispersion at freezing temperatures, without unacceptably impairing the warm temperature stability properties of the dispersion.

One group of materials useful as low-temperature destabilizers in freeze indicators according to the invention includes salts. For example, the low-temperature destabilizer can include a salt selected from inorganic salts, monovalent salts, chlorides, potassium chloride, sodium chloride, lithium chloride, ammonium chloride, multivalent salts, multivalent chlorides, calcium chloride, magnesium chloride, zinc chloride and aluminum chloride. Other metal salts can be employed, if desired, for example salts of other metals of Groups I-III of the periodic table of elements, and salts of any of the foregoing metals having other anions for example, sulfate, nitrate, carboxylate, and the like. The low-temperature destabilizer, if employed, can include a single one, or a mixture of, any of the foregoing salts. The metal or other salt employed can be water-soluble, for example, sufficiently water-soluble for the quantity of salt employed to entirely dissolve in the aqueous liquid dispersion medium.

The low-temperature destabilizers can have any of a variety of characteristics suited to the freeze indicator. For example, in freeze indicators employing an ionic stabilizer, the low-temperature destabilizer can include ions which carry a charge opposite to the charge of the temperature sensitive stabilizer. For example, anionically stabilized emulsions are susceptible to destabilization by cations. Also, anionically stabilized emulsions can be more sensitive to multivalent cations than monovalent cations, so that multivalent cations can be used, if desired. Corresponding considerations apply to cationically stabilized emulsions which can be destabilized by anionic materials.

Another group of materials useful as low-temperature destabilizers includes high molecular weight compounds, for example polymers. Suitable high molecular weight, low temperature destabilizers include cationic, anionic, zwitterionic and uncharged compounds. In this context, as used herein, the term a "high molecular weight" includes a molecular weight in the range of from about 1,000 to about 100,000 daltons. The high-molecular weight material can be water-soluble, if desired, for example, sufficiently water-soluble for the quantity of destabilizer employed to entirely dissolve in dispersion medium 12. Furthermore, the high molecular weight material can be a synthetic polymer, if desired. A suitable low temperature destabilizer can comprise two or more such high-molecular weight compounds, if desired.

Suitable polymeric destabilizers employed with an ionically stabilized emulsion can carry an opposite charge to the charge carried by the emulsion. For example, cationic polymers, such as those including quaternary ammonium segments can be used for destabilization of anionically stabilized emulsions.

Some examples of high molecular weight materials useful as low-temperature destabilizers include polyacrylamides, polyvinyl alcohols, polyvinyl pyrrolidones, polyacrylic acids having a molecular weight in the range of from about 1,000 to about 100,000 daltons, and which, optionally, are water soluble, or a mixture of two or more of the foregoing polymers.

The destabilizing action of at least some of the destabilizer materials described herein may be concentration responsive, which is to say, dependent upon the concentration of the destabilizer in the dispersion medium, as will now be described. While the invention is not intended to be limited by this or any other theory, the following explanation is provided to help illustrate some aspects of the invention.

The stability of a dispersion of particles in a liquid medium, such as color-changing emulsion 20, can be seen as being provided by repulsive electrical charges on the surfaces of the particles. The electrical surface charge on the dispersed particles can be increased, and dispersion stability can be enhanced, by employing a stabilizer, as described herein. As long as the electrical surface charge is sufficient to overcome the van der Waals forces which attract the particles together, the dispersion, or suspension, of particles in the liquid medium can be maintained.

In a freeze indicator including an aqueous dispersion, such as color-changing emulsion 20, at the onset of freezing, ice crystals begin to form, removing substantially pure water from the liquid phase of the dispersion medium 12. The concentration of any solute present in the liquid phase, including a destabilizer, if present, increases. The increasing concentration of destabilizer counteracts the surface charges, until, as more ice crystals form, a critical concentration of destabilizer is reached where the van der Waals attractive forces overcome the repulsive electrostatic forces, causing the emulsion to coagulate. The particles in the emulsion gather together or form into a mass or group and are no longer evenly distributed throughout the emulsion, which can be said to collapse.

Thus, the collapse or coagulation of the emulsion can be caused, or initiated, by the relatively high concentration of destabilizer, which is induced by the precipitation of substantially pure water as ice crystals as freezing progresses through the dispersion medium, leaving the destabilizer and any other solids to concentrate in the diminishing volume of residual liquid.

The dispersed phase, or phases including, in the case of color-changing emulsion 20, oil droplets and possibly solid particles, can then coalesce, inducing the color-changing reaction between the reactants in the respective particles, which remain separated prior to coagulation. Following destabilization, the surface structures separating the particles may fail and the liquid phases can intermingle.

Coalescence does not appear to be limited to liquid-liquid intermingling. Coalescence can also occur in response to the freezing of an emulsion such as color-changing emulsion 10, which includes dispersed droplets of liquid first reactant phase 14 and dispersed solid particles of second reactant phase 16. In such a case, the liquid first reactant phase 14 can wet the surfaces of the solid particles of second reactant phase 16. On collapse and coagulation of color-changing emulsion 10, leading to coalescence of the dispersed phase particles, the liquid first reactant phase 14 spreads over the solid particles of second reactant phase 16 on which the liquid phase has coalesced, and can then act as an adhesive, binding the solid particles together in clumps or aggregates.

The solid particles can retain a three dimensional structure after coagulation, with colorant being formed (or removed) at the surfaces of the particles as a result of the color changing reaction between the first and second reactants. This surface reaction can provide a strong visual signal relatively quickly, for example, in less time than would be required for the entire particle to react.

The concentration of stabilizer compound or compounds can be configured to be sufficiently weak to prevent coagulated color-changing emulsion 20 reconstituting upon thawing, if desired, so that the coagulation is irreversible. In many cases, coalescence of the emulsion particles can make reconstitution more difficult. In the case of color-changing emulsion 20, the color-changing reaction once completed, is unlikely to be reversed. Thus color-changing emulsion 20 can continue to exhibit its after-freezing appearance, signaling that a freeze event has occurred, even in the unlikely event that the emulsion has reconstituted and the emulsion particles have become re-dispersed.

Accordingly, the low-temperature destabilizer, if employed, can be present in dispersion medium 12 in a concentration permitting color-changing emulsion 20 to remain stable at ambient temperatures above freezing, and which permits irreversible coagulation of the emulsion at freezing temperatures.

The stabilizer component, if employed, can be configured for a particular embodiment of color-changing emulsion 20, to provide a desired balance of stability at above-freezing temperatures and instability at a freezing temperature, by routine experimentation, employing an emulsion stability test to assess the stabilization efficacy of a given configuration, if desired.

For example, a series of simple tests can be performed, without undue experimentation, to determine a minimum proportion by weight of surfactant that is sufficient to avoid foaming when the color-changing emulsion is lightly agitated. The determined quantity can then be reduced by a suitable figure, for example, by from about 1 percent to about 50 percent to provide a color-changing emulsion having limited stability. In some cases the resultant limited stability color-changing emulsion will be metastable and able to coagulate and coalesce upon freezing. Such color-changing emulsions are generally suitable for use in a freeze indicator according to the invention. In other cases, lower stability at freezing temperatures may be desirable to facilitate coagulation.

Accordingly, in some embodiments of the invention, the color-changing emulsion composition includes a destabilizer to reduce the stability of the emulsion at freezing or near-freezing temperatures so as to aid coagulation when the color-changing emulsion freezes. For such embodiments, a further series of simple tests can be performed with the color-changing emulsion of limited stability, to determine a suitable proportion of destabilizer, which will provide a metastable color-changing emulsion that generates a satisfactory coagulation response upon freezing. For example, further foaming tests can be conducted to determine a maximum proportion by weight of destabilizer that will permit foaming. A suitable proportion of destabilizer related to the determined maximum proportion can then be employed in embodiments of color-changing emulsion 20, for example, a proportion in the range of from about two times to about half the determined maximum proportion of destabilizer can be employed.

Measurement of colloid stability. To assist in formulating a color-changing emulsion according to the invention, or to assist in quality control during manufacture, or for other purposes, the stability of an emulsion component of the color-changing emulsion can be measured, if desired.

Also, quantitative parameters that correlate with desired freeze-related coagulation performance can be determined, without undue experimentation. For example, the electrophoretic mobility, or zeta potential, of an emulsion can be determined experimentally, by colloid titration with, for example, calcium ions, to produce a metastable mixture, and establish zeta potential limits for a particular embodiment of color-changing emulsion. Techniques such as microelectrophoresis, electrophoretic light scattering, or electroacoustic characterization, or other suitable techniques can also be employed to evaluate the stability of an emulsion employed in the practice of the invention, if desired.

Ice Nucleant

As already described herein, color-changing emulsion 20 can include an ice nucleant to help overcome supercooling and provide a freeze response at a temperature closer to the melting point of the dispersion medium than would otherwise occur. An ice nucleant can reduce the effect of supercooling, elevate the actual freezing temperature of the dispersion medium, and hence of the color-changing emulsion, thereby narrowing the difference between the melting point and the freezing point of the color-changing emulsion.

Some ice nucleants useful in the practice of the invention have one or more of the following properties: effectiveness in ordinary, light water at a temperature not lower than about −3° C.; effectiveness at a concentration of not more than about 2 percent by weight in a liquid volume of 1 µl or 0.5 µl; continuing effectiveness after storage at refrigerated and/or room temperatures for two years or more; and effectiveness after exposure to a temperature of 50° C. for 30 days.

Any material having suitable ice-nucleating properties can be employed in freeze indicator embodiments of the invention, if desired. In general, materials useful for ice nucleation are water-insoluble or sparingly soluble in water, and have a crystal structure similar to the crystal structure of ice. Useful ice-nucleating agents, also known as ice nucleants, include certain inorganic crystals and various proteinaceous materials.

Silver iodide is a commonly used inorganic material, which can be employed in freeze indicator embodiments of the invention. Some other inorganic crystal ice nucleants that can be employed include cold-precipitated silver iodide/silver bromide mixtures and copper sulfide. Other suitable inorganic crystal ice nucleants that can be employed will be known or apparent to a person of ordinary skill in the art, in light of this disclosure, or will become known or apparent in the future, as the art develops.

Some useful proteinaceous ice nucleants agents that can be employed in color-changing emulsion embodiments of the invention include a cell-free proteinaceous ice nucleating agent, or a whole-cell proteinaceous ice nucleating agent, obtained from a microorganism selected from *Pseudomonas* species, *Pseudomonas syringae*, strains of *Pseudomonas syringae*, strains of *Pseudomonas syringae* as described in U.S. Pat. No. 5,489,521 to So et al., *Pseudomonas fluorescens*, *Pseudomonas coronafaciens*, *Pseudomonas pisi*, *Erwinias* species, *Erwinia ananas*, *Erwinia herbicola*, *Escherichia coli*, *Xanthomonas*, ice-nucleating fungi and ice-nucleating protozoa. Cell-free proteinaceous ice nucleating agents suitable for use in practicing the invention can be prepared from suitable ice-nucleating microorganisms by any suitable method, for example as described in U.S. Pat. No. 5,223,412 to Wight et al.

Proteinaceous ice nucleants useful in the practice of the invention include natural, synthetic and recombinant polypeptides having an amino acid sequence including or consisting of a region homologous with, or analogous to, the ice crystal template region of the ice-nucleating protein InaZ. Some pertinent structural characteristics of the ice nucleating protein InaZ are further described in Jung, H-C et al, *Enzyme Microb. Technol.* 1998, 22: 348-354, the disclosure of which is incorporated by reference herein. One microorganism-derived ice-nucleating material, described as a snow inducer, which is suitable for use in the practice of the invention, is SNOMAX (trademark) snow inducer, a freeze-dried proteinaceous material available from Johnson Controls Inc., Milwaukee, Wis., www.johnsoncontrols.com. As described by the supplier, an average composition of SNOMAX snow inducer comprises about 54 percent by weight of protein, including ice-nucleating protein, which protein material is derived from the bacterium *Pseudomonas syringae*. Further information about SNOMAX snow inducer can be found in "Snomax FAQ's," which is available from www.johnsoncontrols.com, the disclosure of which is incorporated by reference herein.

If desired, freeze indicator embodiments of the invention which employ a proteinaceous nucleating agent, or other biologically degradable material, can include a suitable protein stabilizer to stabilize the ice nucleant against thermal or other degradation. During its intended life, a freeze indicator can be exposed to relatively high ambient temperatures, or other conditions that may degrade proteinaceous materials.

Some examples of suitable protein stabilizers that can be employed include formaldehyde, dialdehydes, dialdehydes having no more than ten carbon atoms, glyoxal, glutaraldehyde ($CHO.CH_2CH_2CH_2.CHO$), adipaldehyde, guanidine hydrochloride, malonaldehyde, succinaldehyde, and terephthalaldehyde. Some other suitable protein stabilizers include various crosslinkers, for example, thiol-specific crosslinkers such as dibromoacetone or bismaleimidohexane, and amino-specific crosslinkers such as isocyanates and isothiocyanates.

Also, a biocide can be included in a color-changing emulsion employing a proteinaceous ice nucleant, to prevent microbial spoilage, if desired. Certain protein stabilizers, for example, dialdehydes, can also serve as biocides, when used in a sufficient concentration, such as the protein stabilizer concentrations described herein. Other biocides that can be employed, will be known or apparent to a person of ordinary skill in the art, in light of this disclosure.

Any suitable quantity of proteinaceous ice nucleant can be employed in a given volume of color-changing emulsion 20, for example, a weight of from about 1 µg to about 2 mg; or from about 20 µg to about 500 µg; or from about 100 µg to about 250 µg.

One embodiment of freeze indicator according to the invention employs an envelope 34 having a cylinder about 3 mm in diameter with a depth, or thickness, of about 1 µm, providing a volume of about 0.006 µl accommodating color-changing emulsion 20. This freeze indicator embodiment employs about 6 ng (nanogram) of proteinaceous ice nucleant. Comparable embodiments of freeze indicator employing variations of these parameters will be apparent to a person of ordinary skill in the art, in light of this disclosure.

A protein stabilizer, if employed, can be utilized in any suitable proportion, for example, in a proportion by weight, based on the weight of the color-changing emulsion, of from about 0.001 percent to about 2 percent; from about 0.01 percent to about 1.0 percent; and from about 0.05 percent to about 0.5 percent. In some embodiments of color-changing emulsion 20, the concentration of proteinaceous ice nucleant is not more than 0.1 percent by weight, based on the weight of the color-changing emulsion.

Furthermore, if a protein stabilizer is employed, one of the following stabilizer ratios with respect to the proteinaceous ice nucleant can be utilized: less than 20; a ratio of 10 or below; a ratio of 4 or below; a ratio of 2 or below; or a ratio of from about 0.2 to about 1.5. The stabilizer ratio, as used herein, is the ratio of the weight proportion of protein stabilizer to the weight proportion of proteinaceous ice nucleant in the color-changing emulsion, the weight proportions being based upon the weight of the color-changing emulsion. A low stabilizer ratio, that provides adequate stabilization can be employed, if desired. Stabilization of the proteinaceous ice nucleant, if employed, may be accompanied by a reduction in efficacy of the ice nucleant. Additional information regarding the use of proteinaceous ice-nucleants and protein stabilizers in freeze indicators can be found in the Smith et al. US Patent Application Publication No. 2011/0209658.

Other materials that are consistent with the objectives of the invention can also be included in a freeze indicator dispersion employed in a freeze indicator according to the invention, if desired.

The invention includes embodiments of color-changing emulsion and freeze indicator that consist exclusively of, or consist essentially of, the described ingredients and components.

Proportions of Ingredients

Any suitable proportions of ingredients that are consistent with the objectives of the invention can be employed in practicing the invention. Some suitable proportions are described below. Other suitable proportions will be known or apparent to a person of ordinary skill in the art, in light of this disclosure, or will become known or apparent in the future, as the art develops Useful amounts and proportions can be determined without undue experimentation according to the intended thickness of a particular embodiment of freeze indicator 30, a desired developed color intensity, and other parameters.

Some useful considerations with regard to the proportions employed include that one or the other of the first reactant or the second reactant can be employed in excess, if desired. Also, the quantity of any stabilizer component employed and suitable relative proportions of surfactant, if multiple surfactants are employed, can also be determined without undue experimentation, by testing or observing various trial emulsion formulations for suitable properties.

Some embodiments of freeze indicator 30 can employ a relatively high concentration of a colored or color-developing first reactant, for example a leuco dye precursor. In general, the higher the concentration of colorant in a color-changing emulsion according to the invention, before or after freezing, the more intense the color that can be obtained from a given amount of dispersed or colloidal colorant, and the thinner the layer of colored emulsion required to provide a desired color intensity.

Based upon the weight of the color-changing emulsion, a color-changing emulsion according to the invention, such as color-changing emulsion 10, or color-changing emulsion 20, can have a proportion by weight of a dispersion medium, such as dispersion medium 12, in one of the following ranges, if desired: from about 10 percent to about 99.5 percent; from about 40 percent to about 65 percent; from about 45 percent to about 55 percent; from about 45 percent to about 55 percent; and from about 20 percent to about 40 percent.

Based upon the weight of the color-changing emulsion, the color-changing emulsion can have a proportion by weight of a first reactant phase, such as first reactant phase 14, in one of the following ranges, if desired: from about 0.2 percent to about 70 percent; from about 5 percent to about 40 percent; and from about 20 percent to about 35 percent.

Based upon the weight of the color-changing emulsion, the color-changing emulsion can have a proportion by weight of a second reactant phase, such as second reactant phase 16 or 26, in a range of from about 0.2 percent to about 70 percent.

If the second reactant phase consists essentially of solid particles of the second reactant, the proportion of second reactant phase can be from about 0.1 percent to about 45 percent; from about 0.5 percent to about 15 percent; or from about 1 percent to about 7 percent. If the second reactant phase includes a solvent for the second reactant, for example a hydrophobic oil, the proportion of second reactant phase can be from about 1 percent to about 70 percent; or from about 10 percent to about 30 percent.

Based upon the weight of the color-changing emulsion, the color-changing emulsion can have a proportion by weight of first reactant in one of the following ranges, if desired: from about 0.1 percent to about 35 percent; and from about 2 percent to about 8 percent.

Based upon the weight of the color-changing emulsion, if the second reactant phase includes a solvent for the second reactant, for example, a hydrophobic oil, the color-changing emulsion can have a proportion by weight of second reactant in one of the following ranges, if desired: from about 0.3 percent to about 35 percent; and from about 2 percent to about 8 percent.

Based upon the weight of the color-changing emulsion, the color-changing emulsion can have a proportion by weight of an ice nucleant, if desired, in one of the following ranges: from about 0.01 percent to about 5 percent; and from about 0.2 percent to about 2 percent.

Based upon the weight of the color-changing emulsion, the color-changing emulsion can have a proportion by weight of a stabilizer component, if desired, in one of the following ranges: from about 0.1 percent to about 10 percent; from about 0.5 percent to about 5 percent; and from about 1 percent to about 3.5 percent.

The proportion of stabilizer component can affect the particle size of the emulsion. Emulsions having a small average particle size, for example less than about 200 nm or less than about 100 nm, can be relatively stable and easy to make. Emulsions having a larger average particle size, for example, from about 700 nm to about 1 μm (1000 nm) can be made by an inverse emulsion process, as described herein, if desired. An inverse emulsion process can also be used to make emulsions with a smaller average particle size. Thus, the emulsion particle size can vary between wide limits, for example from about 50 nm to about 2 μm. An average emulsion particle size of the order of 1 μm, for example, from about 0.5 μm to about 2 μm, can scatter light giving the emulsion opacity, or a whitish appearance, or tinge, which can be useful, in some cases, to mask undesired background color, or for other purposes.

Smaller emulsion particles will have a greater surface area per unit mass than larger particles, so that a greater proportion of stabilizer component than would be employed with larger particles can be helpful to emulsion stability when preparing emulsions with a relatively small average particle size. The difference in surface area is proportional to the square of the particle size so that, for example, the difference between particles having a 50 nm average diameter and a 500 nm average diameter is 100 fold. A suitable proportion of stabilizer component can be selected to take account of these considerations, and other considerations, as will be apparent from this disclosure.

Based upon the weight of the dispersion medium, the color-changing emulsion can have a proportion by weight of deuterium oxide, if desired, in one of the following ranges: from about 0 percent to about 100 percent; from about 10 percent to about 100 percent; and from about 90 percent to about 100 percent.

Based upon the weight of the dispersion medium, the color-changing emulsion can have a proportion by weight of first reactant phase, if desired, in one of the following ranges: from about 0.2 percent to about 150 percent; from about 0.5 percent to about 55 percent; and from about 30 percent to about 55 percent.

Based upon the weight of the dispersion medium, the color-changing emulsion can have a proportion by weight of second reactant phase, if desired, in one of the following ranges: from about 0.2 percent to about 150 percent; from about 0.5 percent to about 55 percent; and from about 15 percent to about 55 percent.

Based upon the weight of the dispersion medium, the color-changing emulsion can have a proportion by weight of ice nucleant, if desired, in one of the following ranges: from about 0.01 percent to about 5 percent; and from about 0.2 percent to about 2 percent.

Based upon the weight of the dispersion medium, the color-changing emulsion can have a proportion by weight of a stabilizer component, if desired, in one of the following ranges: from about 0.05 percent to about 10 percent; from about 0.1 percent to about 2 percent; and from about 0.5 percent to about 4 percent.

The balance of the dispersion medium, if any, can be water, i.e. light water.

Based upon the weight of the first reactant phase, the color-changing emulsion can have a proportion by weight of first reactant, if desired, in one of the following ranges: from about 0.5 percent to about 100 percent; from about 5 percent to about 40 percent; and from about 0.5 percent to about 10 percent.

Based upon the weight of the first reactant phase, the color-changing emulsion can have a proportion by weight of first hydrophobic liquid, for example a hydrophobic oil, if desired, in one of the following ranges: from about 10 percent to about 99 percent; and from about 70 percent to about 95 percent.

Based upon the weight of the first reactant phase, the color-changing emulsion can have a proportion by weight of stabilizer component, if desired, in one of the following ranges: from about 0.2 percent to about 10 percent; and from about 0.5 percent to about 5 percent.

Based upon the weight of the first reactant phase, the color-changing emulsion can have a proportion by weight of second reactant phase, if desired, in one of the following ranges: from about 5 percent to about 500 percent; from about 50 percent to about 300 percent; and from about 100 percent to about 200 percent.

Based upon the weight of the first reactant, the color-changing emulsion can have a proportion by weight of second reactant, if desired, in one of the following ranges: from about 20 percent to about 800 percent; and from about 100 percent to about 500 percent.

Based upon the weight of the first reactant, the color-changing emulsion can have a proportion by weight of stabilizer component, if desired, in one of the following ranges: from about 20 percent to about 800 percent; and from about 100 percent to about 500 percent.

Based upon the weight of the second reactant phase, the color-changing emulsion can have a proportion by weight of second reactant, if desired, in one of the following ranges:

from about 0.5 percent to about 100 percent; from about 5 percent to about 40 percent; and from about 0.5 percent to about 10 percent.

Based upon the weight of the second reactant phase, the color-changing emulsion can have a proportion by weight of second hydrophobic liquid, for example a hydrophobic oil, if desired, in one of the following ranges: from about 50 percent to about 99 percent; and from about 70 percent to about 95 percent.

Based upon the weight of the second reactant phase, the color-changing emulsion can have a proportion by weight of a second stabilizer in one of the following ranges, if desired: from about 0.2 percent to about 10 percent; and from about 2 percent to about 8 percent.

Based upon the weight of the color precursor emulsion, a color precursor emulsion useful in preparing a color-changing emulsion according to the invention, for example, color precursor emulsion 88, can have a proportion by weight of a stabilizer component in one of the following ranges, if desired: from about 0.1 percent to about 10 percent; and from about 0.5 percent to about 3 percent.

Based upon the weight of the color precursor emulsion, the color precursor emulsion can have a proportion by weight of color precursor in one of the following ranges, if desired: from about 0.1 percent to about 50 percent; and from about 0.5 percent to about 5 percent.

Based upon the weight of the color precursor emulsion, the color precursor emulsion can have a proportion by weight of hydrophobic oil in one of the following ranges, if desired: from about 10 percent to about 70 percent; and from about 40 percent to about 50 percent.

Based upon the weight of the color precursor emulsion, the color precursor emulsion can have a proportion by weight of aqueous dispersion medium in one of the following ranges, if desired: from about 20 percent to about 70 percent; and from about 40 percent to about 50 percent. The color precursor emulsion can have a weight ratio of color precursor to stabilizer component in one of the following ranges, if desired: from about 0.2:1 to about 10:1; and from about 0.5:1 to about 3:1.

Based upon the weight of the color developer emulsion, a color developer emulsion useful in preparing a color-changing emulsion according to the invention, for example, color developer emulsion 108, can have a proportion by weight of a stabilizer component in one of the following ranges, if desired: from about 0.1 percent to about 10 percent; and from about 0.5 percent to about 5 percent.

Based upon the weight of the color developer emulsion, the color developer emulsion can have a proportion by weight of color developer in one of the following ranges, if desired: from about 0.1 percent to about 50 percent; and from about 0.5 percent to about 5 percent.

Based upon the weight of the color developer emulsion, the color developer emulsion can have a proportion by weight of hydrophobic oil in one of the following ranges, if desired: from about 2 percent to about 75 percent; and from about 40 percent to about 50 percent.

Based upon the weight of the color developer emulsion, the color developer emulsion can have a proportion by weight of aqueous dispersion medium in one of the following ranges, if desired: from about 20 percent to about 95 percent; and from about 40 percent to about 50 percent.

The color developer emulsion can have a ratio of color developer to stabilizer component in one of the following ranges, if desired: from about 0.3:1 to about 10:1; and from about 0.6:1 to about 3:1.

Some examples of proportions of components that a color-changing emulsion according to the invention can employ are shown in Table 1 for three proportion examples PE1, PE2 and PE3, and for Example 1. Process Example 1 is described subsequently herein.

TABLE 1

Examples of Color-Changing Emulsion Proportions

| Ingredient | PE1 | PE2 | PE3 | Ex. 1 |
|---|---|---|---|---|
| Proportions based on weight of color-changing emulsion (=100) | | | | |
| Dispersion medium | 47.9 | 49.9 | 49.9 | 49.9 |
| First reactant phase | 24 | 25 | 33.3 | 16.7 |
| Second reactant phase | 24 | 25 | 16.7 | 33.3 |
| First reactant | (5) | (5) | (0.33) | (0.33) |
| Second reactant | (5) | (5) | (1.7) | (1.5) |
| Ice nucleant | 0.1 | 0.1 | 0.1 | 0.1 |
| Stabilizer component | 2 | (2) | (2.8) | (3.6) |
| Proportions based on weight of dispersion medium (=100) | | | | |
| Deuterium oxide | 100 | 20 | 0 | 0 |
| Light (ordinary) water | — | 80 | 100 | 100 |
| First reactant phase | 48 | 50 | 66.7 | 33.3 |
| Second reactant phase | 48 | 50 | 33.3 | 66.7 |
| Ice nucleant | 0.2 | 2 | 2 | 2 |
| Stabilizer component | 4 | (4) | (6.2) | (7.2) |
| Proportions based on weight of first reactant phase (=100) | | | | |
| First reactant | 20 | 19.2 | 1 | 2 |
| First hydrophobic liquid | 80 | 76.8 | 94 | 88 |
| Stabilizer component | — | 4 | 5 | 10 |
| Second reactant phase | 100 | 100 | 200 | 200 |
| Proportions based on weight of second reactant phase (=100) | | | | |
| Second reactant | 20 | 19.2 | 10 | 4.6 |
| Second hydrophobic liquid | 80 | 76.8 | 83.2 | 88.6 |
| Second stabilizer | — | 4 | 6.8 | 6.8 |

In Table 1, the basis for calculating the proportions is shown in a separate row above the rows of proportions to which the basis applies. Proportions shown parenthetically indicate the respective ingredient is an element of another emulsion component for which a proportion is given.

Proportion Examples PE1, PE2 and PE3, as set forth in Table 1, illustrate some specific proportions of ingredients that can be employed in color-changing emulsion embodiments of the invention.

Some examples of proportions of components employable for a color precursor emulsion useful in preparing a color-changing emulsion according to the invention are shown in Table 1A for certain color precursor emulsions identified as CP1-CP4. Color precursor emulsions CP1-CP4 are more fully described subsequently herein, in Example 3. The proportions shown in Table 1A are based on the weight of the color precursor emulsion (=100).

TABLE 1A

Examples of Color Precursor Emulsion Proportions

| Ingredient | CP1 | CP2 | CP3 | CP4 |
|---|---|---|---|---|
| First reactant (color precursor) | 1.0 | 2.4 | 2.4 | 0.96 |
| First hydrophobic liquid (oil) | 47.4 | 45.8 | 45.8 | 48.2 |
| Dispersion medium (water) | 50 | 50 | 50 | 50 |
| Stabilizer component (surfactant) | 1.7 | 1.5 | 1.6 | 0.8 |
| Reactant:stabilizer ratio | 0.58 | 1.56 | 1.49 | 1.19 |

Some examples of proportions of components employable for a color developer emulsion useful in preparing a color-changing emulsion according to the invention are shown in Table 1B for color developer emulsions CD1-CD3. Color developer emulsions CD1-CD3 are more fully described elsewhere herein, in Example 3. The proportions shown in Table 1B are based on the weight of the color developer emulsion (=100).

TABLE 1B

Examples of Color Developer Emulsion Proportions

| Ingredient | Ex. CD1 | Ex. CD2 | Ex. CD3 |
|---|---|---|---|
| First reactant (color developer) | 2.4 | 2.4 | 2.5 |
| Second hydrophobic liquid (oil) | 46.0 | 45.1 | 45.6 |
| Dispersion medium (water) | 51.6 | 50.0 | 49.5 |
| Stabilizer component (surfactant) | 3.2 | 2.5 | 1.4 |
| Reactant:stabilizer ratio | 0.75 | 0.95 | 1.71 |

Some illustrative and nonlimiting examples of the practice of some aspects of the invention, and of one or more comparative examples, will now be described.

EXAMPLE 1

Preparation of a Color-Changing Emulsion for a Freeze Indicator

In the following example, all parts are parts by weight. To prepare a color precursor emulsion, a mixture of 1 part crystal violet lactone color precursor, 5 parts nonionic surfactant (TERGITOL® 15-5-15, Dow Chemical, Midland, Mich.) and 44 parts terphenyl oil (MCS 2811 Solutia, St. Louis, Miss.) is prepared and heated to about 80° C. to dissolve the crystal violet lactone in the oil. The resultant oil solution, containing surfactant and color precursor, is transparent, has a pale yellow color, and exemplifies one possible embodiment of color precursor solution 84. The color-precursor-in-oil solution temperature is maintained at about 80° C.

A vial containing 50 parts of distilled water is heated to 60° C. or a little above. A homogenizer is inserted into the hot color-precursor-in-oil solution beginning low speed agitation until the temperature is at about 80° C., at which point the agitation rate is increased to a moderate speed. About 15 parts of the hot distilled water is added slowly to the color-precursor-in-oil solution. The mixture appears to emulsify and has an oily appearance indicative of formation of a water-in-oil emulsion. The speed of the homogenizer is increased to high and the slow addition of the water is continued. During the addition, the mixture suddenly and rapidly turns white, and becomes opaque, indicating inversion of the emulsion. The remainder of the vial of water is added, the heat is removed and the homogenizer is operated at low speed until the mixture has returned to near ambient temperature. The resultant oil-in-water emulsion exemplifies one possible embodiment of color precursor emulsion 88.

To prepare a color developer emulsion, a mixture of 2.3 parts purified zinc-containing modified alkylphenolic resin (HRJ 2053, SI Group, Schenectady, N.Y.), 3.4 parts nonionic surfactant and 44.2 parts terphenyl oil is prepared, using the same surfactant and oil as are used in preparing the color-precursor-in-oil solution. The mixture is heated to about 80° C. to aid dissolution, yielding a surfactant-containing color-developer-in-oil solution, which is one exemplary embodiment of color developer solution 104. The color-developer-in-oil solution, which is also light yellow is maintained at about 80° C.

A vial containing a further 50 parts of distilled water is heated to 60° C., or a little above. A homogenizer is inserted into the hot color developer solution, beginning low speed agitation until the temperature is at about 80° C., at which point moderate agitation begins. About 15 parts of the hot distilled water is added slowly to the solution. The mixture appears to emulsify and has an oily appearance indicative of formation of a water-in-oil emulsion. The speed of the homogenizer is increased to high, and the addition of the water is continued slowly. During the addition, the mixture suddenly and rapidly turns white, and becomes opaque, indicating inversion of the emulsion. The remainder of the vial of water is added, the heat is removed, and the homogenizer is operated at low speed until the mixture has returned to near ambient temperature, yielding a color developer emulsion, which is an exemplary embodiment of color developer emulsion 108.

To prepare a color-changing emulsion, 33 parts of the previously prepared color precursor emulsion, 1 part of freeze-dried ice nucleating agent (SNOMAX® snow inducer, Johnson Controls Inc., Milwaukee, Wis.) and 66 parts of the color developer emulsion are mixed in a closed vessel by shaking. The resultant product is a leuco-dye-based color-changing emulsion having an opaque, bluish white or off-white appearance, when viewed in a transparent tube having a diameter of about 10 mm, and is an exemplary embodiment of color-changing emulsion 20. As can be calculated from the ingredient proportions described in this example, the emulsion product has a composition consisting of approximately 49.5 parts water, 44.5 parts terphenyl oil, 3.1 parts nonionic surfactant, 1.6 parts modified alkylphenolic resin developer, 0.3 parts crystal violet lactone and 1 part ice nucleant.

EXPERIMENT 1

Freeze Indicator Performance (Emulsion of Example 1)

The response to freezing of the color-changing emulsion prepared in Example 1 is evaluated by freezing the emulsion and observing the color change, if any. One sample of the emulsion is placed in a freezer estimated to have a temperature of −10° C. or lower, for a period in excess of one hour, and then removed. Another sample is maintained unfrozen at approximately room temperature. When removed, the freezer sample appears to be frozen and has a medium blue appearance, as viewed in a transparent tube having a diameter of about 10 mm. The medium blue frozen appearance is distinctly different from the bluish white or off-white appearance of the unfrozen emulsion sample. Upon thawing of the frozen sample, the emulsion separates and two phases become visible, a medium blue oily phase, floating on top of a lighter blue, translucent, water phase. The thawed mixture also has a medium blue appearance, which is distinctly different from the bluish-white, or near-white, appearance of the emulsion before freeze exposure.

A drop of the medium blue thawed mixture is placed on a flat metal surface alongside a drop of the bluish white, never-frozen indicator emulsion. A thick glass plate is placed on top of the drops of liquid with a spacer at one end only, to create a wedge-shaped profile for each liquid drop. The thickness of the drops at various points along the wedge is calculated. The two liquids have distinctly different appearances, plainly discernible by normal human observation, at a distance of 0.5 m or more, when their thicknesses are 0.04 mm or greater. The exposure to freezing experienced by the thawed sample is clearly indicated by the different appearance of the thawed sample from that of the never-frozen sample.

EXAMPLE 2

Emulsion Prepared with Pretreatment of Color Developer

Example 2 repeats Example 1 with the difference that, before use, the alkylphenolic resin is pretreated with water to remove water-soluble impurities and reduce undesired background color. Thus, the alkylphenolic resin is mixed with distilled water in a proportion of about 1:70 by weight, and with a non-ionic surfactant in a proportion of about 30:1 by weight resin to surfactant. The mixture is brought to a boil, melting the resin. The aqueous phase is poured off and the water treatment of the resin is repeated three times. The final mixture is cooled to crystallize the resin. The resin is separated from the water, dried, ground to a powder and then used in the preparation of a color-changing emulsion, as described in Example 1.

EXAMPLE 3

Preparation of Further Color-Changing Emulsions

Example 3 repeats Example 1 using each of the color precursors shown in Table 2, each of which is a leuco dye, in place of the color precursor used in Example 1. Each of the Table 2 color precursors is available from Emerald Hilton Davis, Cincinnati, Ohio, under the respective trade name shown. These color precursors are identified in Table 2 by abbreviations in the column headed "reactant". The abbreviations are also used in Tables 3-7 herein to identify the respective reactants. The corresponding color emulsions prepared in this example are identified as emulsions numbers CP1 to CP4.

TABLE 2

| Color Precursors | | |
|---|---|---|
| Emulsion No. | Abbreviation | Trade name |
| CP1 | CVL | Crystal violet lactone |
| CP2 | ODB-1 | Specialty black 4 |

TABLE 2-continued

| Color Precursors | | |
|---|---|---|
| Emulsion No. | Abbreviation | Trade name |
| CP3 | ODB-2 | Specialty black 34 |
| CP4 | SM-20: | Specialty magenta 20 |

Three color developer emulsions, identified as emulsions nos. CD1, CD2 and CD3, are prepared, using the purified zinc-containing modified alkylphenolic resin employed in Example 1, identified by the abbreviation "HRJ" in Table 2, as a leuco dye color developer. The weight-proportion compositions and appearances of color precursor emulsions CP1 to CP4 and color developer emulsions CD1 to CD3 are shown in Table 3. The balance to 100 percent (%) is distilled water.

TABLE 3

Reactant Emulsions Used to Prepare Color-Changing Emulsions

| Emulsion No. | Reactant | Surf. % | Dev. % | Prec. % | MCS % | Oil Phase % | React:Surf. ratio | Color |
|---|---|---|---|---|---|---|---|---|
| CD1 | HRJ | 3.2 | 2.4 | | 46.0 | 48.4 | 0.75 | Creamy stable |
| CD2 | HRJ | 2.5 | 2.4 | | 45.1 | 50 | 0.95 | White stable |
| CD3 | HRJ | 1.4 | 2.5 | | 45.6 | 50.6 | 1.71 | Creamy settled |
| CP1 | CVL | 1.7 | | 1.0 | 47.4 | 50.9 | 0.58 | White settled |
| CP2 | ODB-1 | 1.5 | | 2.4 | 45.8 | 50.3 | 1.56 | White stable |
| CP3 | ODB-2 | 1.6 | | 2.4 | 45.8 | 50.2 | 1.49 | White stable |
| CP4 | SM20 | 0.8 | | 0.96 | 48.2 | 50 | 1.19 | White stable |

In Table 3, The heading "Surf." indicates surfactant, "Dev." indicates color developer, "Prec." indicates color precursor, "MCS" indicates the terphenyl oil used in Example 1, "React:Surf. ratio" indicates the ratio of reactant to surfactant. As already implied, all percentages, parts and proportions in this example (Example 3) are by weight. The last column of Table 3 indicates the color and stability of the respective color precursor emulsion or color developer emulsion prepared in this example.

The appearances of the emulsions are observed after storage at room temperature for at least two weeks. The results are noted in the last column of Table 3. All the emulsions are white or creamy white, i.e. have a near-white color, and are somewhat opaque. None of the seven emulsions coalesces, or changes visually, after two weeks of storage, although two exhibit minor settling, possibly due to the presence of relatively large particles. Such minor settling is not considered to have adverse commercial implications.

The particle size distribution of each of emulsions CD3, CP2 and CP4 is examined using a Malvern Zeta-Sizer. The distribution of each emulsion is found to be monomodal with distribution peaks exhibited at 0.87 µm, 1.0 µm and 1.5 µm respectively.

After twelve months of storage at normal room temperature all the emulsions except emulsion CP3 are free of coagulation or coalescence. However, some settling occurs. Emulsion CP3 was partially aggregated.

Four color-changing emulsions, numbered 3A-3D in Table 4, are prepared by mixing one part of the color precursor emulsion shown in Table 4 with two parts of the color developer emulsion shown in Table 4. The pH of mixture 3D is near neutral.

Having a relatively neutral pH, for example, a pH in a range of from about pH 6 to about pH 8, can be beneficial to color-changing emulsion embodiment of the invention. A relatively neutral pH implies less potential undesired chemical reactivity, for example, with emulsion containment materials or entrained air, and longer potential shelf life, or product life, than color-changing emulsions with more acidic, or more basic, pHs might have.

TABLE 4

Compositions of Color-Changing Emulsions

| Emul. No. | Pre-cursor | Dev. Emul No. | Prec. Emul. No. | Mixture Ratio | Surf % | Dev % | Prec % | Oil % | Surf:Dev Ratio | Surf:Prec Ratio | Surf:Oil Ratio | Dev:Prec Ratio |
|---|---|---|---|---|---|---|---|---|---|---|---|---|
| 3A | CVL | CD2 | CP1 | 2:1 | 2.2 | 1.6 | 0.3 | 45.9 | 1.4 | 6.9 | 0.05 | 4.9 |
| 3B | ODB-1 | CD1 | CP2 | 2:1 | 2.7 | 1.6 | 0.8 | 45.9 | 1.7 | 3.3 | 0.06 | 2.0 |
| 3C | ODB-2 | CD1 | CP3 | 2:1 | 2.4 | 1.6 | 0.8 | 45.2 | 1.5 | 5.6 | 0.06 | 3.7 |
| 3D | SM20 | CD3 | CP4 | 2:1 | 1.2 | 1.6 | 0.3 | 32.7 | 0.7 | 3.8 | 0.04 | 5.1 |

EXPERIMENT 2

Freeze Indicator Performance (Emulsions of Example 3)

Each of the color-changing emulsions prepared in Example 3 is examined to evaluate its response to freezing by freezing the emulsion and observing any color change following the procedure described in Experiment 1. The appearances of each emulsion before freezing (never frozen), and after freezing, are described in Table 5, which is discussed further subsequently.

Each never-frozen color-changing emulsion 3A-3D is opaque and exhibits a slight background color: bluish white for Emulsion No. 3A (CVL); pale pink for Emulsion No. 3D (SM20) and light gray for each of Emulsions Nos. 3B (ODB-1) and 3C ODB-2. None of the emulsions coalesces. Each settles slightly. The times when a background color begins to emerge, and the intensities of the background color, relative to a one-year old sample, are shown in Table 4A.

TABLE 4A

Background Appearances

| Emul. No. | Pre-cursor | First color change seen | Appearance after 1 hour |
|---|---|---|---|
| 3A | CVL | Immediate | Similar to 1 year old sample |
| 3B | ODB-1 | After 10 min | Approaching density of 1 year old sample |
| 3C | ODB-2 | Immediate | Similar to 1 year old sample |
| 3D | SM20 | Immediate | Similar to 1 year old sample |

Among the samples examined, Emulsion 3B with the color precursor ODB-1, is slower to develop color than Emulsions 3A, 3C and 3D, and has less relative background color after one hour.

Once frozen, each color-changing emulsion becomes darker in color and develops an oily appearance. After thawing, each emulsion is significantly more colored than the respective comparative sample that has not been frozen. Upon resting for sixty minutes each emulsion separates into a coalesced phase and a supernatant containing residual emulsion particles. In each case, the optical difference between the frozen sample and the corresponding never-frozen sample is pronounced and readily apparent to the human eye at a distance of a meter or more, without special viewing equipment.

TABLE 5

Appearances of Color-Changing Emulsions

| Emulsion No. | Precursor | Surf. (%) | Dev. (%) | Surf:Dev Ratio | Surf:Prec Ratio | Never-Frozen Dispersion | | Frozen Dispersion | |
|---|---|---|---|---|---|---|---|---|---|
| 3A | CVL | 2.2 | 1.6 | 1.4 | 6.9 | Bluish white | Stable | Blue | Separated |
| 3B | ODB-1 | 2.7 | 1.6 | 1.7 | 3.3 | Light Grey | Stable | Near black | Separated |
| 3C | ODB-2 | 2.4 | 1.6 | 1.5 | 5.6 | Light Grey | Stable | Near black | Separated |
| 3D | SM20 | 1.2 | 1.6 | 0.7 | 3.8 | Pale Pink | Stable | Magenta | Separated |

As noted in Table 5, emulsion No. 3A exhibits a freeze-induced color transition from pale pink to red. Emulsions Nos. 3B and 3C each exhibit a transition from light grey to a dark, almost black appearance. These colors and color changes are consistent with some conventions for safe and unsafe appearances, and can be useful to indicate the potential acceptability or potential unacceptability of a host product. Accordingly, consumers or others can understand, without undue difficulty, when a freeze indicator incorporating one of emulsions 3A-3D is signaling a potentially safe, fresh, or acceptable, never-frozen condition and when the same freeze indicator is signaling a potentially unsafe, loss-of freshness, or unacceptable condition as a result of having been frozen.

After twelve months storage at normal room temperature, all four color-changing emulsions 3A-3D remain free of coagulation or coalescence, although some settling occurs. Upon re-suspension, by agitating, the emulsions appear unchanged from their initial states. This demonstrated stability after twelve months storage suggests that freeze indicators employing the color-changing emulsions would have shelf lives of twelve months under comparable storage conditions, and may have longer shelf lives, in some circumstances.

To facilitate comprehension of the information communicated by the freeze indicator signal, some freeze indicator embodiments of the invention can exhibit color changes that correspond with conventionally understood indications of safe and unsafe. Such indications include, for example, white, near-white, or another light appearance, or green to indicate safe, or "OK" and red, black, or dark gray, to indicate the possibility of an unsafe or unacceptable condition of an associated host product. One freeze indicator embodiment, described in Example 3, emulsion 3D, exhibits a change from near white (pale pink) before freezing to the red hue, magenta, after freezing, as shown in Table 5. Emulsions 3B and 3C of Example 3 exhibit a change from light to dark.

The following example, Example 4, describes a color-changing emulsion for a freeze indicator that provides a change from green, before the emulsion freezes, to dark gray or black, after the emulsion has been frozen.

EXAMPLE 4

A Green-to-Black Freeze Indicator

Example 3 is repeated to prepare separately a color precursor emulsion 4A, employing the color precursor ODB-1, and a color developer emulsion 4B, employing the color developer HRJ The proportions of ingredients shown in Table 6 are used.

TABLE 6

Example 4 Proportions

| Emulsion No. | Reactant | Surf. % | Dev. % | Prec. % | MCS % | Solids % | Color |
|---|---|---|---|---|---|---|---|
| 4A | ODB-1 | 2.4 | | 2.4 | 46.4 | 51.2 | near-white |
| 4B | HRJ | 1.8 | 2.5 | | 46.6 | 50.9 | near-white |
| 4C | 4A/4B 1:1 Mixture | 2.1 | 1.2 | 1.2 | 46.5 | 51.1 | light gray |

Both color precursor emulsion 4A and color developer emulsion 4B are near-white in color, and stable. Equal amounts of emulsions 4A and 4B are then mixed as described in Example 1, to yielding color-changing emulsion 4C. Color-changing emulsion 4C has a light gray color when prepared. On freezing, the color changes to dark gray. On thawing the color intensifies, and after standing the emulsion separates into a black oil and nearly clear supernatant. Thus, after freezing, thawing and standing, color-changing emulsion 4C has a black appearance when viewed from above.

Reconstituted SNOMAX® ice nucleant is added in a proportion of about 1 percent by weight dry matter, to color-changing emulsion 4C. A 7 µl blister having a 3 mm diameter formed in clear polyvinyl chloride film is filled with this emulsion and sealed with a water resistant self-adhesive tape. The curved surface of the blister is coated with a transparent green ink providing a light filter giving the blister a bright green appearance as the transparent green coating is viewed by reflection from the light-colored, unfrozen emulsion. After freezing the blister has a dark color, with little, if any, green hue. When thawed, the indicator appears black and the green color is no longer apparent. The blister appearances are as viewed normally by the human eye.

EXAMPLE 5

Freeze-Induced Coalescence Shown Comparatively

Example 4 is repeated to prepare separately a color precursor emulsion 5A, employing the color precursor ODB-1, a color developer emulsion 5B employing the color developer HRJ, and a color-changing emulsion 5C employing a mixture of emulsions 5A and 5B. The proportions of ingredients shown in Table 7 are used. Rather than equal weight proportions, as are employed in Example 4, a large excess of the color developer HRJ is mixed with the color precursor ODB-1 so as to prepare a color-changing emulsion 5C that develops background color rapidly with these ingredients. The surfactant employed is an AEROSOL® TR-70 anionic surfactant and the proportions are on an oven-dry weight basis.

TABLE 7

Example 5 Proportions

| Emulsion No. | Reactant | Surf. % | Dev. % | Prec. % | MCS % | Solids % | Color |
|---|---|---|---|---|---|---|---|
| 5A | ODB-1 | 2.3 | | 2.3 | 46.5 | 51.1 | light gray |
| 5B | HRJ | 2.3 | 2.3 | | 45.4 | 50.0 | cream |
| 5C | 5A/5B 1:4 Mixture | 2.3 | 1.9 | 0.5 | 45.6 | 50.2 | light gray to dark gray |

Color precursor emulsion 5A has a light gray color, and color developer emulsion 5B has a cream color. Both emulsions 5A and 5B appear to be stable. One part by weight of emulsion 5A is mixed with four parts by weight of emulsion 5B, as described in Example 1, to yield color-changing emulsion 5C. Color-changing emulsion 5C has a light gray color when initially prepared, but darkens over the course of about 2 hours to become dark gray. Separate 0.4 ml samples of color-changing emulsion 5C are placed in 0.6 ml polypropylene tubes. Within 2 minutes of mixing, and while still light gray in color, a first one of the two samples is immersed in an ice/salt/water bath at about −8° C. The first sample freezes relatively quickly and darkens, as the water in the sample freezes, becoming black in color when most of the water has frozen. The frozen sample has a matte appearance. One hour after mixing the background color of the second sample is well developed and the sample appears dark gray. The second sample is then immersed in the ice/salt/water bath at −8° C. This sample also freezes rapidly, and when frozen has a similar appearance to the appearance of the first sample when frozen. On thawing, the two samples are indistinguishable, each having a mottled appearance of black oil interspersed with grey dispersion.

The large excess of color developer, and the particular combination of ingredients employed in Example 5 (color precursor ODB-1 and color developer HRJ), yield an emulsion, Emulsion 5C, which develops background color relatively rapidly, when a sample is allowed to stand at room temperature, namely, in about two hours. In contrast, the sample that is frozen promptly after preparation turns black within a few minutes of freeze exposure suggesting that the sample's color change is freeze induced, rather than being caused by other factors.

Some embodiments of freeze indicator according to the invention can exhibit an unmistakable freeze-induced appearance change in a relatively short period of time, for example within 1 hour of exposure to a freezing temperature, or a lower temperature, is desirable. The invention also includes mass-produced freeze indicators that yield an unmistakable freeze-induced appearance change, consistently and reliably, from one sample to the next, after exposure for shorter time periods, for example, 15 minutes or 5 minutes or another period under about 30 minutes.

Benefits. Some embodiments of the invention include color-changing emulsions useful as a freeze-sensitive fluid in a blister-type freeze indicator, which can exhibit an intense color change on activation, can be functional in a small volume, and which can retain freeze-sensitivity for extended periods.

Embodiments of the invention can also provide a color-changing emulsion useful in a freeze indicator having the properties of long-term stability, optionally, including stability at temperatures elevated above ordinary room temperature, and consistency of coalescence on freezing. In some cases, these attributes can be assessed visually following appropriate exposure.

Furthermore, the invention can provide freeze-sensitive color-changing emulsions useful as active elements in freeze indicators, which can exhibit an intense color, and/or a pronounced or dramatic color change, and can be formulated from a wide range of color-forming reactants.

Host Products

Freeze indicators according to the invention generally can be used with a freeze-sensitive host product to indicate possible exposure of the host product to a freezing temperature. The host product can be any freeze-sensitive product including the freeze-sensitive products described herein, other freeze-sensitive products described in the Taylor et al. patent publications or any other freeze-sensitive products that will be known or apparent to a person of ordinary skill in the art, in light of this disclosure, or will become known or apparent in the future, as being suitable for monitoring with a freeze indicator embodiment of the invention.

Some examples of suitable host products include vaccines, medications and foodstuffs. Some further examples of suitable host products include: freeze-perishable health care products, for example vaccines, drugs, medicaments, pharmaceuticals, biological pharmaceuticals, macromolecular pharmaceuticals, medical devices, prophylactics, vaccine vials, syringes containing perishable biologicals, or other freeze-sensitive health care products, biological materials having therapeutic uses, cultures, organs and other human or animal body parts, blood and perishable blood products; diagnostic devices, kits and ingredients containing freeze-perishables; freeze-sensitive biological materials for industrial uses; freeze-sensitive industrial products including latex paints and the like; and freeze-sensitive food products, fruits, truffles, gourmet meats, fish and other food products whose organoleptic qualities may be impaired by freezing.

The invention includes a freeze-sensitive host product having a freeze indicator according to the invention associated with the host product.

The freeze indicator can be associated with the host product in any suitable manner that will enable the freeze indicator to be exposed to similar ambient temperature conditions to the host product. For example, the freeze indicator can be attached to the host product, or to a package, carton or other container containing the host product, or multiple units of the host product, by an adhesive-coated substrate which supports the freeze indicator, by a tie, or in another suitable manner. Some suitable means for association with, or attachment of freeze indicators to host products, which can be employed in practicing the present invention, are also described in the Taylor et al. patent publications.

A freeze indicator embodiment of the invention can include a combination of any technical feature or features recited in one of the appended claims with a technical feature recited in any other claim or claims, unless the respective technical features would be mutually incompatible, or the specification teaches against making the combination.

Disclosures Incorporated. The entire disclosure of any United States patent or patent application, any foreign or international patent publication, of any other publication and of any unpublished patent application that is specifically referenced in this specification is hereby incorporated by reference herein, in its entirety. Should there appear to be conflict between the meaning of a term employed in the description of the invention in this specification and with the usage in material incorporated by reference from another document, the meaning as used herein is intended to prevail.

The terms "include," "have," "has," and "contain," and their various grammatical forms, are to be understood as being open-ended and as not excluding additional, unrecited elements or method steps.

Throughout the description, where compositions instruments, devices apparatus, systems, or processes are described as having, including, or comprising specific components or elements, or in the case of processes, specific steps, it is contemplated that compositions instruments, devices apparatus, systems, or processes according to the present invention can also consist essentially of, or consist of, the recited components, elements or steps.

In the application, where an element or component is said to be included in and/or selected from a list or group of recited elements or components, it should be understood that the element or component can be any one of the recited elements or components, or can be selected from two or more of the recited elements or components.

The use of the singular herein is intended to include the plural unless the context indicates otherwise. In addition, where the term "about" is used before a quantitative value, the specific quantitative value itself is intended to be included, unless specifically stated otherwise.

With regard to processes, it is to be understood that the order of steps, or order for performing certain actions is immaterial as long as the described process remains operable. Moreover, two or more steps or actions may be conducted simultaneously, unless the context indicates otherwise. In addition, any proportions recited herein are to be understood to be proportions by weight, based upon the weight of the relevant composition, unless the context indicates otherwise.

The foregoing detailed description is to be read in light of and in combination with the preceding background and invention summary descriptions wherein partial or complete information regarding the practice of the invention, or regarding modifications, alternatives or useful embodiments of the invention, or uses of embodiments of the invention may also be set forth or suggested, as will be apparent to one skilled in the art, and comprises an integral part of the description of the invention. No admission is made that the field of any document cited in the background or elsewhere in this application, which field may be quite different from that of the invention, is analogous to the field or fields of the present invention.

The description of the invention is to be understood as including combinations of the various elements of the invention, and of their disclosed or suggested alternatives, including alternatives disclosed, implied or suggested in any one or more of the various methods, products, compositions, systems, apparatus, instruments, aspects, embodiments, examples described in the specification or drawings, if any, and to include any other written or illustrated combination or grouping of elements of the invention or of the possible practice of the invention, except for groups or combinations of elements that are incompatible with, or contrary to the purposes of the invention, as will be or become apparent to a person of ordinary skill.

The present invention includes the examples and embodiments described herein and other specific forms that embody the spirit or essential characteristics of the invention or of the respective described examples or embodiments. The foregoing examples and embodiments are in all respects intended to be illustrative of the invention described herein. It is to be understood that many and various modifications of the invention, or of an example or embodiment of the invention described herein will be apparent to those of ordinary skill in the relevant art, or may become apparent as the art develops, in the light of the foregoing description. Such modifications are contemplated as being within the spirit and scope of the invention or inventions disclosed herein.

The invention claimed is:

1. A color-changing emulsion for a freeze indicator, the color-changing emulsion comprising:
    an aqueous liquid dispersion medium;
    a first reactant phase dispersed in the dispersion medium, the first reactant phase comprising a hydrophobic liquid and a first reactant dissolved or dispersed in the hydrophobic liquid; and
    a second reactant phase dispersed in the dispersion medium, the second reactant phase being unmixed with the first reactant phase and comprising a second reactant, the second reactant being co-reactable with the first reactant to provide a color change;
    wherein the first reactant and the second reactant co-react in response to exposure to a freezing temperature to change the color of the color-changing emulsion irreversibly.

2. A color-changing emulsion according to claim 1 wherein at least one of the first reactant and the second reactant is dissolved in a liquid or is liquid, the second reactant is co-reactable with the first reactant in a chemical reaction and, in response to the exposure of the color-changing emulsion to the freezing temperature, the color-changing emulsion can coagulate and the first reactant phase can coalesce with the second reactant phase.

3. A color-changing emulsion according to claim 1 wherein the color-changing emulsion comprises colloidal particles of the first reactant phase and colloidal particles of the second reactant phase.

4. A color-changing emulsion according to claim 1 wherein the dispersion medium is free of organic liquid and the color-changing emulsion comprises an ice nucleant dispersed in the dispersion medium.

5. A color-changing emulsion according to claim 4 wherein the color-changing emulsion comprises a stabilizer component configured to stabilize the color-changing emulsion at a temperature above freezing and to permit the color-changing emulsion to coagulate in response to a freezing temperature and a destabilizer compound to facilitate coagulation of the color-changing emulsion at a freezing temperature.

6. A color-changing emulsion according claim 5 wherein the first reactant comprises a color precursor dissolved in the hydrophobic liquid and the second reactant comprises a color developer.

7. A color-changing emulsion according to claim 6 wherein the dispersion medium comprises at least about 10 percent by weight, based on the weight of the dispersion medium, of deuterium oxide.

8. A color-changing emulsion according to claim 1 wherein the color-changing emulsion comprises a stabilizer component configured to stabilize the color-changing emulsion at a temperature above freezing and to permit the color-changing emulsion to coagulate in response to a freezing temperature.

9. A color-changing emulsion according claim 1 wherein the first reactant comprises a color precursor dissolved in the hydrophobic liquid and the second reactant comprises a color developer.

10. A color-changing emulsion according to claim 9 wherein the color precursor comprises a leuco dye precursor and the color developer comprises a leuco dye developer.

11. A color-changing emulsion according to claim 1 wherein one of the first reactant and the second reactant comprises a colored material and the other of the first reactant and the second reactant comprises a color-depleting agent.

12. A color-changing emulsion according to claim 1 wherein the hydrophobic liquid comprises a first hydrophobic liquid and the second reactant is dissolved or dispersed in a second hydrophobic liquid, the second hydrophobic liquid being the same as, or different from, the first hydrophobic liquid.

13. A color-changing emulsion according to claim 1 wherein the dispersion medium comprises at least about 10 percent by weight, based on the weight of the dispersion medium, of deuterium oxide.

14. A freeze indicator comprising a color-changing emulsion according to claim 1.

15. A freeze indicator according to claim 14 wherein the color-changing emulsion can modulate light reflected from or transmitted by the freeze indicator and the freeze indicator includes an additional light-modulating element to modify the appearance of the color-changing emulsion.

16. A freeze indicator according to claim 14 comprising an envelope containing the color-changing emulsion, the envelope entirely enclosing the color-changing emulsion with vapor block material and being sealed around the color-changing emulsion to prevent loss of water vapor from the color-changing emulsion.

17. A freeze indicator according to claim 16 comprising a substrate supporting the envelope, the substrate providing a light-reflecting background for the emulsion.

18. A freeze indicator according to claim 14 capable of generating a green optical signal before freezing, and a black or dark gray optical signal after being frozen.

19. A method of making a color-changing emulsion for use in a freeze indicator, the method comprising:
    (a) dissolving or dispersing a first reactant in a hydrophobic liquid to provide a first reactant phase;
    (b) dispersing the first reactant phase in an aqueous liquid dispersion medium to provide a first reactant dispersion; and
    (c) mixing a second reactant phase comprising a second reactant with the first reactant dispersion to provide the color-changing emulsion, the first reactant and the second reactant being co-reactable to provide a color change; wherein, in the color-changing emulsion, the first reactant phase and the second reactant phase are dispersed in the aqueous liquid medium and the first reactant phase is unmixed with the second reactant phase, and wherein the color-changing emulsion;
    can change color irreversibly in response to exposure to a freezing temperature.

20. A method according to claim 19 wherein the aqueous liquid dispersion medium comprises a first aqueous liquid dispersion medium, and the method comprises dispersing the second reactant phase in a second aqueous liquid dispersion medium to form a second reactant dispersion, the second aqueous liquid dispersion medium being the same as, or different from, the first aqueous liquid dispersion medium, and mixing the second reactant dispersion with the first reactant dispersion to provide the color-changing emulsion.

21. A method according to claim 20 wherein the second reactant is co-reactable with the first reactant in a chemical reaction, the method comprising mixing the second reactant dispersion with the first reactant dispersion without coalescing the second reactant phase with the first reactant phase.

22. A method according to claim 20 comprising dissolving a stabilizer component of the first reactant dispersion in the first aqueous liquid dispersion medium prior to dispersing the first reactant phase in the first aqueous liquid dispersion medium.

23. A method according to claim 20 comprising preparing the first reactant dispersion by dispersing the first aqueous liquid dispersion medium in the first reactant phase to yield a water-in-oil emulsion, and inverting the water-in-oil emulsion to yield the first reactant dispersion in the form of an oil-in-water emulsion.

24. A method according to claim 20 wherein the hydrophobic liquid is a first hydrophobic liquid, and the method comprises dissolving the second reactant in a second hydrophobic liquid to provide the second reactant phase whereby the second reactant dispersion is a second reactant emulsion.

25. A method according to claim 24 comprising dispersing the second aqueous liquid dispersion medium in the second reactant phase to yield a water-in-oil emulsion and inverting the water-in-oil emulsion to yield the second reactant dispersion as an oil-in-water emulsion.

26. A method according to claim 20 comprising dissolving a stabilizer component of the second reactant dispersion in the second aqueous dispersion medium before dispersing the second reactant phase in the second aqueous dispersion medium.

27. A method according to claim 26 wherein the stabilizer component comprises a stabilizer compound to stabilize the respective first reactant emulsion or the second reactant dispersion at a temperature above freezing and a destabilizer compound to facilitate coagulation of the color-changing emulsion at a freezing temperature.

28. A method according to claim 20 wherein the first aqueous liquid medium and the second aqueous liquid medium are free of organic liquid.

29. A color-changing emulsion produced by a method according to claim 19.

30. A freeze indicator comprising a color-changing emulsion according to claim 29.

* * * * *